(12) United States Patent
Zhang et al.

(10) Patent No.: US 12,217,336 B2
(45) Date of Patent: Feb. 4, 2025

(54) IMAGE CROPPING METHOD AND ELECTRONIC DEVICE

(71) Applicant: Huawei Technologies Co., Ltd., Shenzhen (CN)

(72) Inventors: Yundie Zhang, Shenzhen (CN); Liang Hu, Shenzhen (CN); Yifan Ji, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 599 days.

(21) Appl. No.: 17/435,493

(22) PCT Filed: Feb. 26, 2020

(86) PCT No.: PCT/CN2020/076695
§ 371 (c)(1),
(2) Date: Sep. 1, 2021

(87) PCT Pub. No.: WO2020/177583
PCT Pub. Date: Sep. 10, 2020

(65) Prior Publication Data
US 2022/0139008 A1    May 5, 2022

(30) Foreign Application Priority Data
Mar. 1, 2019 (CN) .......................... 201910156703.6

(51) Int. Cl.
| | | |
|---|---|---|
| G06T 11/20 | (2006.01) |
| G06T 7/11 | (2017.01) |
| G06T 7/13 | (2017.01) |
| G06T 7/40 | (2017.01) |
| G06T 7/60 | (2017.01) |
| G06V 10/22 | (2022.01) |
| G06V 40/16 | (2022.01) |

(52) U.S. Cl.
CPC .............. G06T 11/203 (2013.01); G06T 7/11 (2017.01); G06T 7/13 (2017.01); G06T 7/40 (2013.01);
(Continued)

(58) Field of Classification Search
CPC . G06T 11/203; G06T 7/11; G06T 7/13; G06T 7/40; G06T 7/60;
(Continued)

(56) References Cited

U.S. PATENT DOCUMENTS

2010/0290673 A1* 11/2010 Miyashita ............... H04N 23/64
382/175
2012/0242849 A1* 9/2012 Herz ....................... H04N 23/64
348/208.99
(Continued)

FOREIGN PATENT DOCUMENTS

CN    103914689 A  *  7/2014  ............... G06K 9/00
CN    105892869 A  *  8/2016
(Continued)

OTHER PUBLICATIONS

Shenggeng, C., "New Crop Tools for Photoshop CS6," Digital Darkroom, Dec. 2013, 4 pages with English abstract.
(Continued)

Primary Examiner — Edward F Urban
Assistant Examiner — Jongbong Nah
(74) Attorney, Agent, or Firm — Conley Rose, P.C.

(57) ABSTRACT

A method includes obtaining a first image, determining a first target curve of a first region occupied by the first image, where an area of the first region is equal to an area of the first image, determining a target object on the first image, moving the first image to obtain a second image, where a second target curve of a second region in which the target object on the second image is located is close to or overlaps the first target curve, and the second region is an external polygon of the target object, and cropping out an image part that is of the second image and that is moved out of the first region.

20 Claims, 19 Drawing Sheets

(52) U.S. Cl.
CPC .............. *G06T 7/60* (2013.01); *G06V 10/225* (2022.01); *G06V 10/235* (2022.01); *G06V 40/161* (2022.01); *G06T 2207/20021* (2013.01); *G06T 2207/20132* (2013.01); *G06T 2207/30201* (2013.01); *G06T 2210/12* (2013.01); *G06T 2210/22* (2013.01)

(58) Field of Classification Search
CPC . G06T 2207/20021; G06T 2207/20132; G06T 2207/30201; G06T 2210/12; G06T 2210/22; G06T 2207/20092; G06T 7/136; G06T 2207/10004; G06V 10/225; G06V 10/235; G06V 40/161
See application file for complete search history.

(56) References Cited

U.S. PATENT DOCUMENTS

2017/0177978 A1* 6/2017 Narasimha ................ G06T 7/90
2017/0243356 A1* 8/2017 Eckert ...................... G06T 7/11

FOREIGN PATENT DOCUMENTS

| | | | |
|---|---|---|---|
| CN | 107123084 | A | 9/2017 |
| CN | 107590461 | A | 1/2018 |
| CN | 107610131 | A | 1/2018 |
| CN | 107678648 | A * | 2/2018 |
| CN | 107749046 | A | 3/2018 |
| CN | 108376255 | A | 8/2018 |
| CN | 108776970 | A | 11/2018 |
| CN | 110223301 | A | 9/2019 |
| EP | 2667292 | A2 | 11/2013 |

OTHER PUBLICATIONS

Castro, J., et al., "An Hybrid Recurrent Convolutional Neural Network for Crop Type Recognition Based on Multitemporal SAR Image Sequences," IGARSS 2018, 4 pages.

Kiaoxin, T., "Chinese version of Photoshop CS6 graphic image processing basis and example, " Ocean Press, Jan. 2014, 12 pages with English abstract.

* cited by examiner

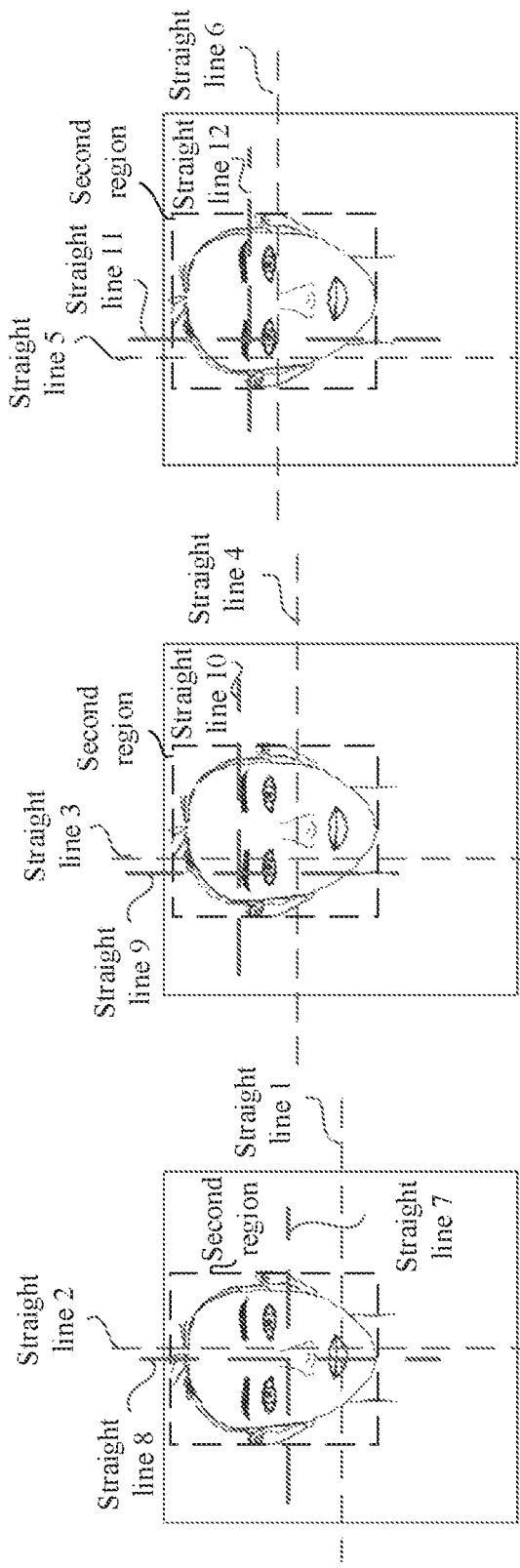

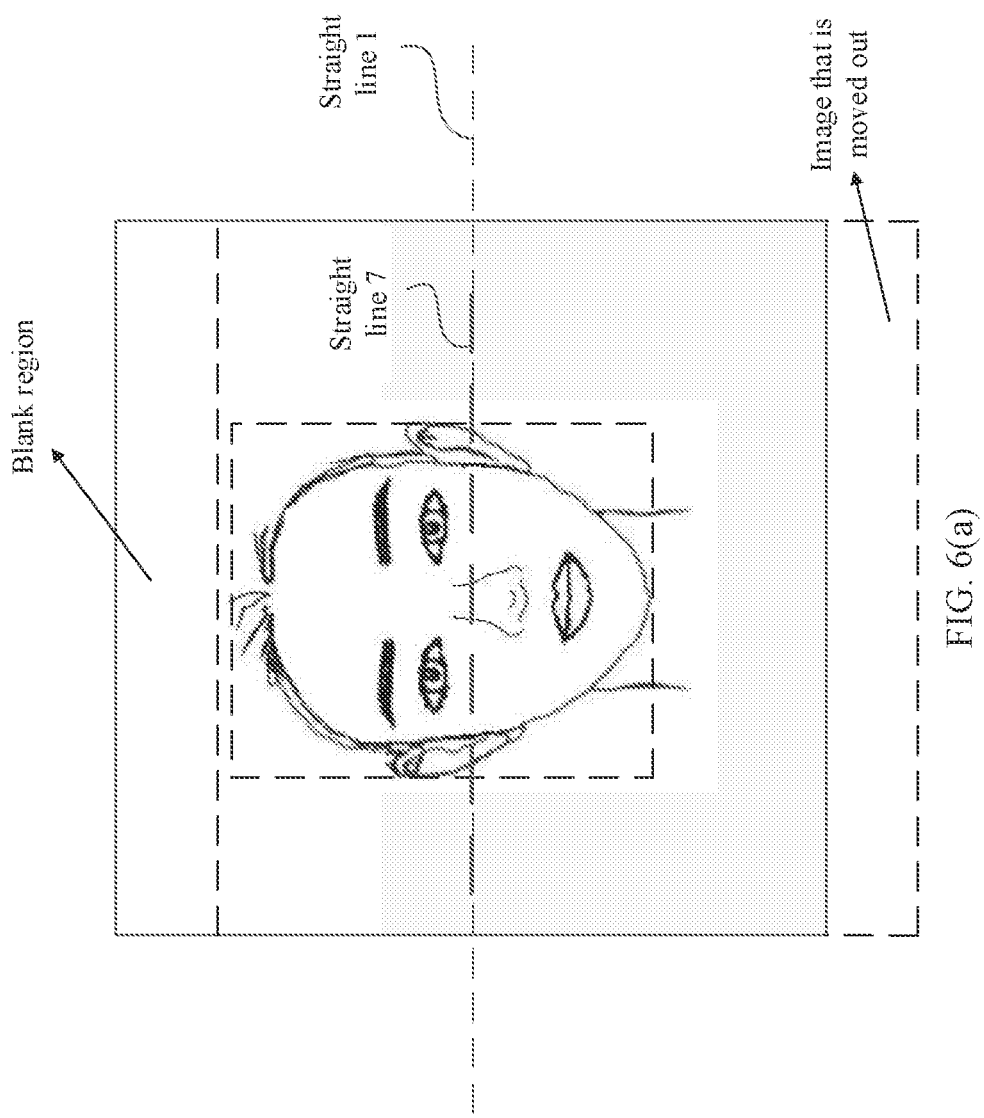

Portrait type
- Super close-up portrait type
  - Determining condition: A height of an image is less than 1 time of a height of a face
  - Processing manner: Move the eyes to a location of a center line, or move the eyes to a location of a golden section line
- Close-up portrait type
  - Determining condition: A height of an image is 1 time to 1.5 times a height of a face
  - Processing manner 1: A distance between the bottom of a region in which the face is located and the bottom of the image is equal to d1
  - Processing manner 2: According to the triangle rule, a distance between a bottom edge of a triangle on a cropped image and a bottom edge of the image is d2
- Bust portrait type
  - Determining condition: A height of an image is 1.5 times or 3 times a height of a face
  - Processing manner 1: Crop the image based on the Fibonacci curve, so that a cropped image meets the Fibonacci curve
  - Processing manner 2: A distance between the top of a face box and the top of the image is greater than or equal to d3
- Half-length portrait type
  - Determining condition: A height of an image is 3 times or 5 times a height of a face
  - Processing manner 1: Crop the image based on the Fibonacci curve, so that a cropped image meets the Fibonacci curve
  - Processing manner 2: A distance between the top of a face box and the top of the image is greater than or equal to d4
- Seven-division portrait type
  - Determining condition: A height of an image is 5 times or 7 times a height of a face
  - Processing manner 1: Crop the image based on the Fibonacci curve, so that a cropped image meets the Fibonacci curve
  - Processing manner 2: A distance between the top of a face box and the top of the image is greater than or equal to d5
- Nine-division portrait type
  - Determining condition: A height of an image is 7 times or 9 times a height of a face
  - Processing manner 1: Composition continuation principle
- Environmental portrait type
  - Determining condition: A height of an image is greater than 9 times of a height of a face
  - Processing manner 1: Composition continuation principle

FIG. 7

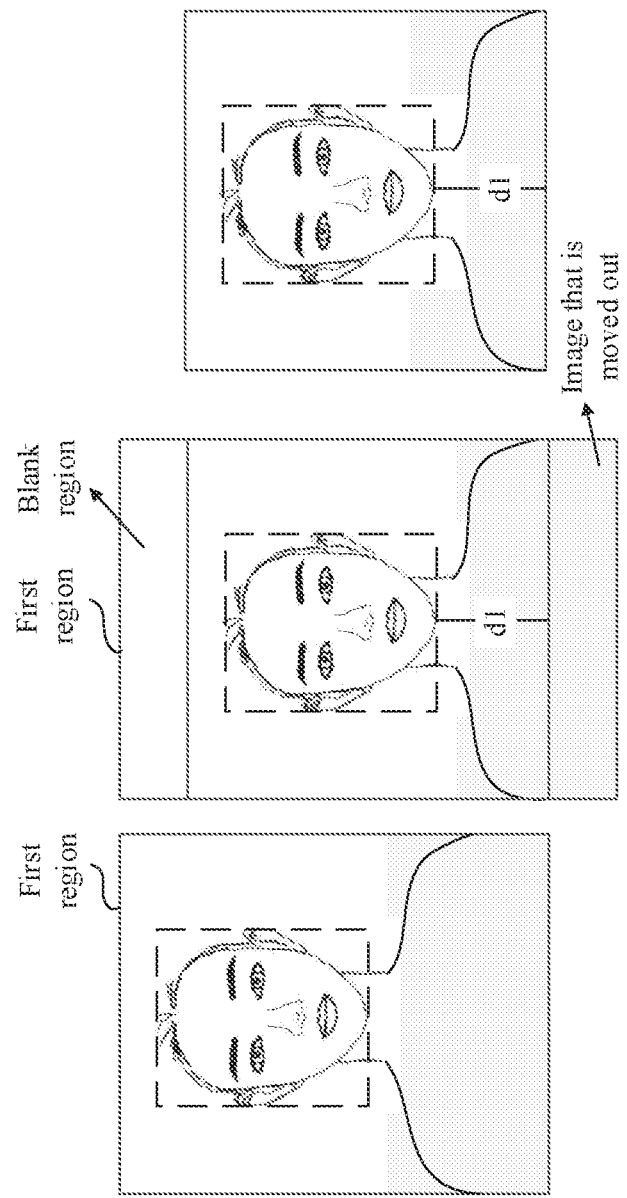

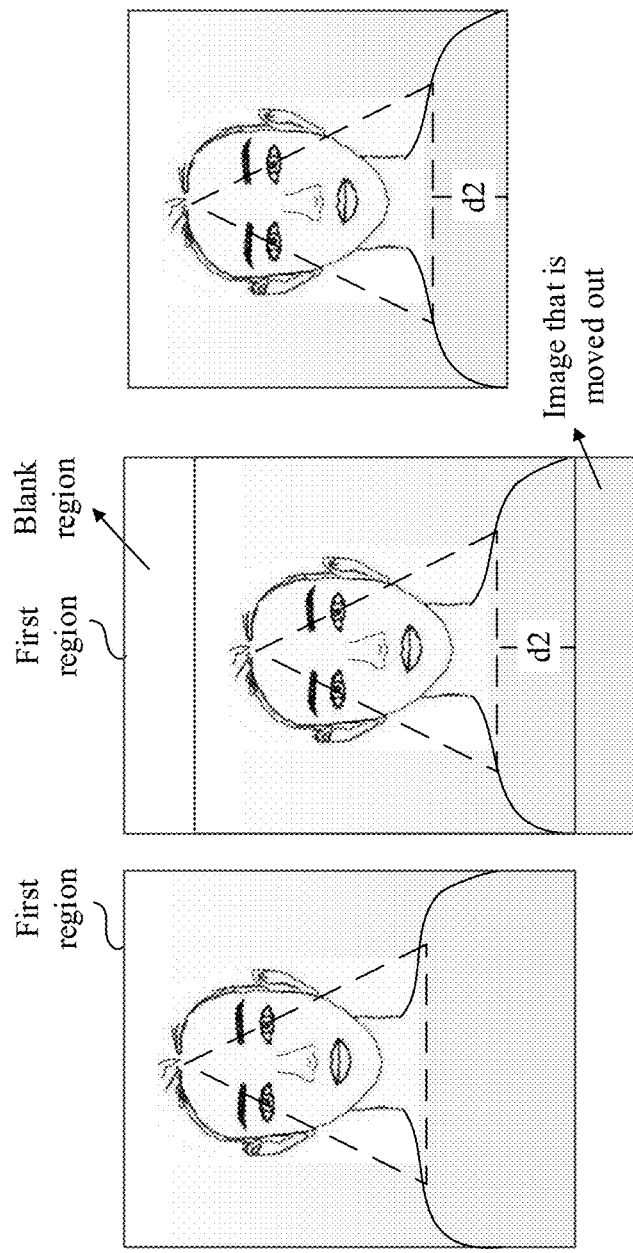

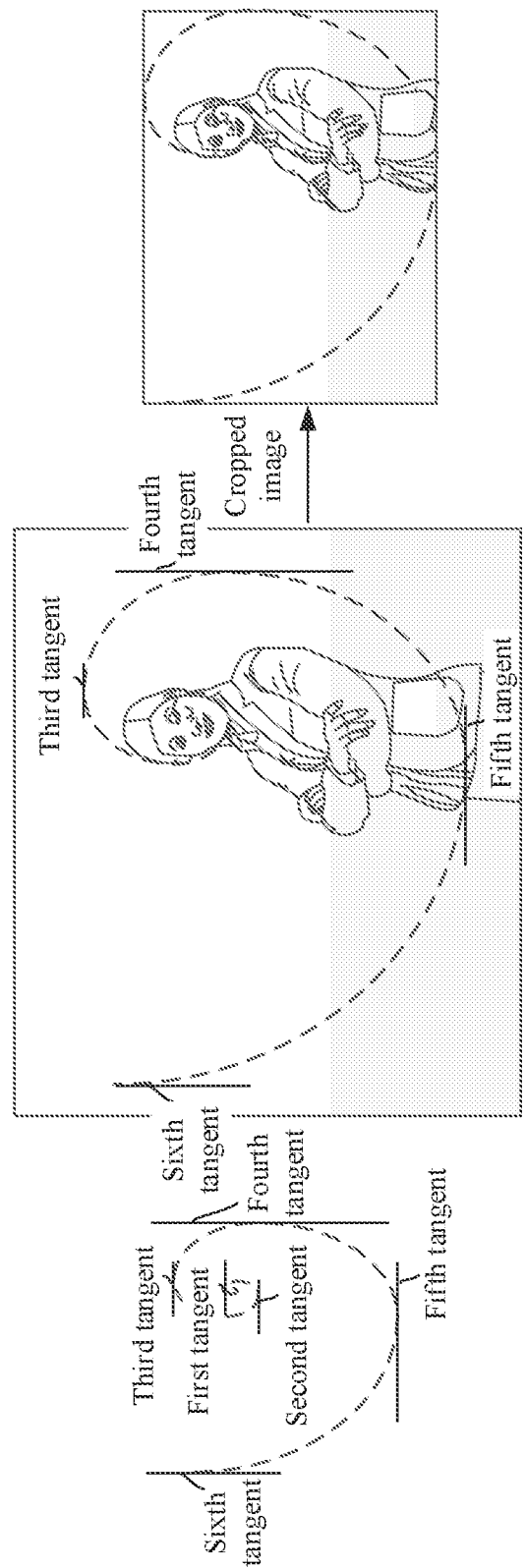

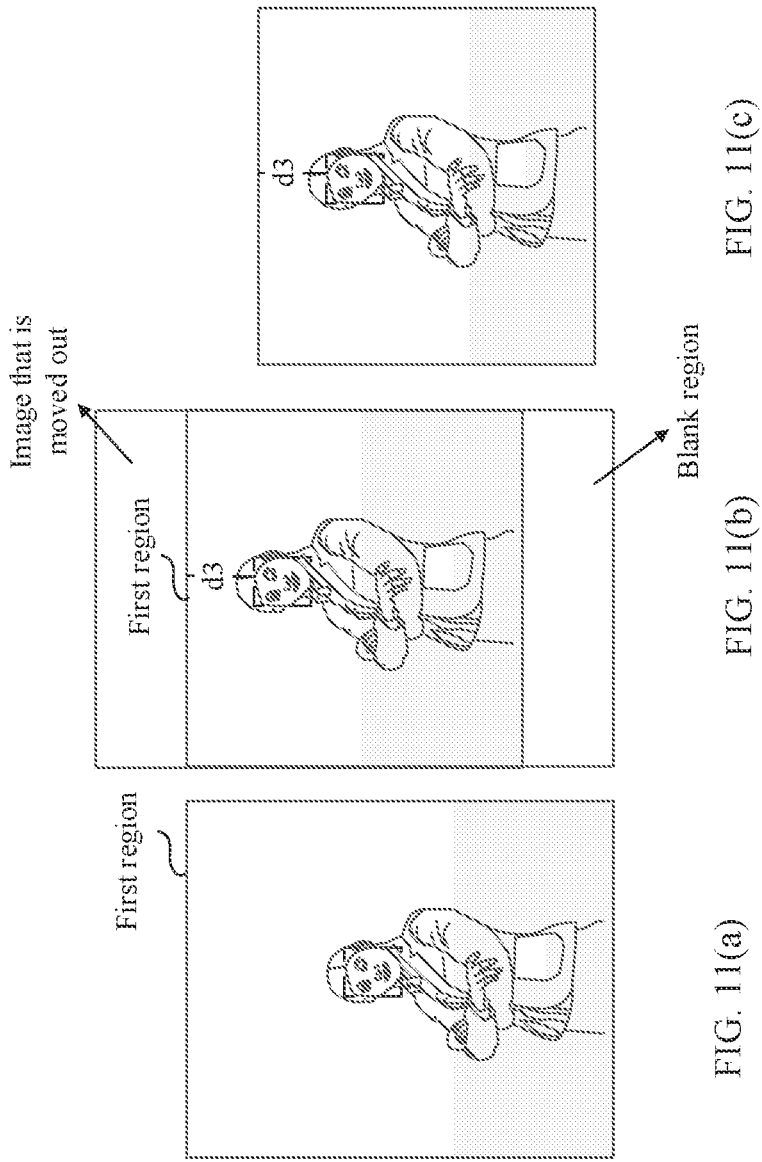

```
┌──────────────────────────────────────────────────────────────────────┐  S1201
│  A mobile phone 100 determines a face box in which each face of all  │
│  faces on a to-be-processed image is located, where N is an integer  │
│  greater than or equal to 2                                          │
└──────────────────────────────────────────────────────────────────────┘
                                  ▼
┌──────────────────────────────────────────────────────────────────────┐  S1202
│  The mobile phone 100 sets a rectangular box, where the rectangular  │
│  box is a minimum external rectangle (or a minimum enclosure         │
│  rectangle) of a first face box, and the first face box is a face    │
│  box with a largest area in all the face boxes                       │
└──────────────────────────────────────────────────────────────────────┘
                                  ▼
┌──────────────────────────────────────────────────────────────────────┐  S1203
│  The mobile phone 100 adjusts a size of the rectangular box, so that │
│  an adjusted rectangular box is a minimum external rectangle (or a   │
│  minimum enclosure rectangle) of the first face box and a second     │
│  face box, where an area of the second face box is a face box with   │
│  a largest area in face boxes other than the first face box          │
└──────────────────────────────────────────────────────────────────────┘
                                  ▼
┌──────────────────────────────────────────────────────────────────────┐  S1204
│  The mobile phone 100 continues to adjust the size of the            │
│  rectangular box, so that an adjusted rectangular box is finally a   │
│  minimum external rectangle (or a minimum enclosure rectangle) of    │
│  all the face boxes                                                  │
└──────────────────────────────────────────────────────────────────────┘
                                  ▼
┌──────────────────────────────────────────────────────────────────────┐  S1205
│  The mobile phone 100 determines a first target curve of the finally │
│  adjusted rectangular box, where the first target curve is a center  │
│  line, a golden section line, a rule of thirds line, or the like of  │
│  the finally adjusted rectangular box                                │
└──────────────────────────────────────────────────────────────────────┘
                                  ▼
┌──────────────────────────────────────────────────────────────────────┐  S1206
│  The mobile phone 100 determines a second target curve of a first    │
│  region in which the to-be-processed image is located, where when    │
│  the first target curve is the center line, the second target curve  │
│  is a center line of the to-be-processed image; when the first       │
│  target curve is the golden section line, the second target curve    │
│  is a golden section line of the to-be-processed image; or when the  │
│  first target curve is the rule of thirds line, the second target    │
│  curve is a rule of thirds line of the to-be-processed image         │
└──────────────────────────────────────────────────────────────────────┘
                                  ▼
┌──────────────────────────────────────────────────────────────────────┐  S1207
│  The mobile phone 100 moves the to-be-processed image, so that the   │
│  first target curve of the finally adjusted rectangular box and the  │
│  second target curve are located on a same straight line             │
└──────────────────────────────────────────────────────────────────────┘
                                  ▼
┌──────────────────────────────────────────────────────────────────────┐  S1208
│  The mobile phone 100 crops out an image that is moved out of the    │
│  first region, to obtain a cropped image                             │
└──────────────────────────────────────────────────────────────────────┘
```

FIG. 12

Length

Aspect ratio: 1:1

Length

Aspect ratio: 4:3

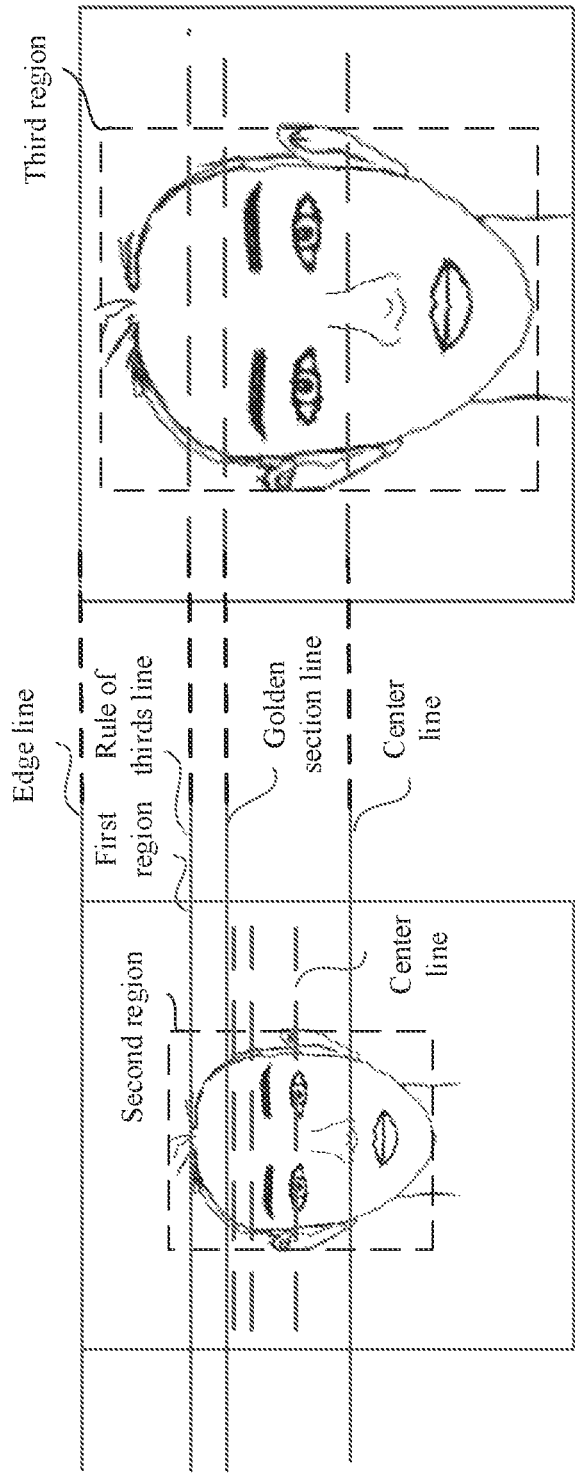

IMAGE CROPPING METHOD AND ELECTRONIC DEVICE

CROSS-REFERENCE TO RELATED APPLICATIONS

This is a U.S. National Stage of International Patent Application No. PCT/CN2020/076695 filed on Feb. 26, 2020, which claims priority to Chinese Patent Application No. 201910156703.6 filed on Mar. 1, 2019. Both of the aforementioned applications are hereby incorporated by reference in their entireties.

This application claims priority to Chinese Patent Application No. 201910156703.6, filed with the China National Intellectual Property Administration on Mar. 1, 2019 and entitled "IMAGE CROPPING METHOD AND ELECTRONIC DEVICE", which is incorporated herein by reference in its entirety.

TECHNICAL FIELD

This application relates to the field of communications technologies, and in particular, to an image cropping method and an electronic device.

BACKGROUND

With development of terminal technologies, a terminal device has an increasingly stronger image processing capability. A user may process a photographed picture by using the terminal device, to obtain an effect desired by the user. An image processing process includes an image cropping process. In the conventional technology, the image cropping process is mainly that the user manually selects a collection region and the terminal device crops out the region.

However, in this manner, the user needs to manually perform an operation, and because aesthetics of users are different, a cropped image is not necessarily perfect. Therefore, there is currently no method for helping the user to obtain an aesthetic image through cropping.

SUMMARY

Embodiments of this application provide an image cropping method and an electronic device, to provide an intelligent image cropping manner.

According to a first aspect, an embodiment of this application provides an image cropping method, where the method may be performed by an electronic device, and the method includes: obtaining a first image; determining a first target curve of a first region occupied by the first image, where an area of the first region is equal to an area of the first image; determining a target object on the first image; moving the first image to obtain a second image, where a second target curve of a second region in which the target object on the second image is located is close to or overlaps the first target curve, and the second region is an external polygon of the target object; and cropping out an image part that is of the second image and that is moved out of the first region.

In this embodiment of this application, the electronic device may move the first image based on the first target curve of the first region in which the first image is located, so that the second target curve of the second region in which the target object on the moved first image is located is close to or overlaps the first target curve, the image that is moved out of the first region is cropped, and a remaining image is a cropped image. In this manner, the electronic device can automatically crop an image, and crop the image based on a first target curve of a region in which an original image is located, so that a second target curve of a region in which a target object on a cropped image is located is close to or overlaps the first target curve.

In a possible design, the target object is at least one preset object, the target object is at least one object specified by a user on the first image, or the target object is at least one object automatically determined by the electronic device based on a plurality of objects on the first image.

In this embodiment of this application, the target object may be preset, may be specified by the user, or may be automatically identified by the electronic device. This is not limited in this embodiment of this application.

In a possible design, the first target curve is a center line, a golden section line, or a rule of thirds line of the first region, where when the first target curve is the center line of the first region, the second target curve is a center line of the second region; when the first target curve is the golden section line of the first region, the second target curve is a golden section line of the second region; or when the first target curve is the rule of thirds line of the first region, the second target curve is a rule of thirds line of the second region.

In this embodiment of this application, the first target curve may be the center line, the rule of thirds line, the golden section line, or the like of the first region in which the first image is located, and the first target curve corresponds to the second target curve of the second region in which the target object is located. That is, when the first target curve is the center line of the first region, the second target curve is a center line of the second region; when the first target curve is the golden section line of the first region, the second target curve is a golden section line of the second region; or when the first target curve is the rule of thirds line of the first region, the second target curve is a rule of thirds line of the second region. Certainly, the first target curve may be another curve such as a four-division line. This is not limited in this embodiment of this application.

In a possible design, before moving the first image, the electronic device further determines that a distance between a third target curve of a third region in which the target object on the first image is located and the first target curve is greater than a preset distance.

In this embodiment of this application, before moving the first image, the electronic device may further determine that the distance between the third target curve of the third region in which the target object on the first image is located and the first target curve is greater than the preset distance. A reason is that if the third target curve of the third region in which the target object on the first image is located is relatively far from the first target curve before the first image is moved, it indicates that the target object on the first image is relatively far from the first target curve. The electronic device may move the first image to obtain the second image. The second target curve of the second region in which the target object is located on the second image is close to or overlaps the first target curve. Then, the electronic device crops out the image that is in the second image and that is moved out of the first region, to obtain the cropped image. In this manner, the electronic device can automatically crop an image, and crop the image based on a first target curve of a region in which an original image is located, so that a second target curve of a region in which a target object on a cropped image is located is close to or overlaps the first target curve.

In a possible design, if the first image includes N persons, the target object is N faces, and the second region is a minimum external rectangle of N face boxes in which the N faces are located.

In this embodiment of this application, the electronic device may crop a group portrait, and the group portrait includes a plurality of persons. In this case, the target object is a plurality of faces, and the second region in which the target object is located may be a minimum external rectangle of a plurality of face boxes. In this manner, the electronic device can automatically crop the group portrait, so that a cropped group portrait includes all faces as much as possible, and the second target curve of the minimum external rectangle of the N face boxes in which the N faces on the cropped image are located is close to or overlaps the first target curve.

In a possible design, before the determining a first target curve of a first region occupied by the first image, the method further includes: determining M first target curves of the first region, where M is an integer greater than or equal to 2; determining M third target curves of the third region in which the target object on the first image is located, where the M first target curves are in a one-to-one correspondence with the M third target curves; and determining a distance value between the $i^{th}$ first target curve and the $i^{th}$ third target curve, to obtain a total of M distance values, where i is any integer ranging from 1 to M; and the determining a first target curve of a first region in which the first image is located includes: determining a first target curve corresponding to a maximum distance value in the M distance values.

In this embodiment of this application, the first region in which the first image is located may have a plurality of first target curves. Correspondingly, before the first image is moved, the second region in which the target object on the first image is located also has a plurality of second target curves. The electronic device may determine the distance value between the $i^{th}$ first target curve and the $i^{th}$ third target curve, to obtain a total of M distance values. The maximum distance value in the M distance values corresponds to the first target curve. In this manner, the electronic device can automatically crop an image, and crop the image based on a first target curve of a region in which an original image is located, so that a second target curve of a region in which a target object on a cropped image is located is close to or overlaps the first target curve.

In a possible design, after cropping out the image part that is of the second image and that is moved out of the first region, the electronic device may further determine a ratio of a width of a remaining image on the second image to a width of a fourth region in which the target object on the remaining image is located. If the ratio is greater than a first threshold, and a distance between an upper edge of the fourth region in which the target object on the remaining image is located and an upper edge of the remaining image is greater than a first preset distance, the electronic device crops the remaining image to obtain a third image, so that a distance between the upper edge of the fourth region in which the target object on the third image is located and an upper edge of the third image falls within a first distance range. If the ratio is less than or equal to the first threshold, and a distance between a lower edge of the fourth region in which the target object on the remaining image is located and a lower edge of the remaining image is greater than a second preset distance, the electronic device crops the remaining image to obtain a fourth image, so that a distance between the lower edge of the fourth region in which the target object on the fourth image is located and a lower edge of the remaining image falls within a second distance range.

In this embodiment of this application, after cropping the second image, the electronic device may continue to crop the remaining image. For example, if the ratio of the width of the remaining image to the width of the fourth region in which the target object on the remaining image is located is relatively large, and the distance between the upper edge of the fourth region in which the target object on the remaining image is located and the upper edge of the remaining image is relatively large, the electronic device crops the remaining image to obtain the third image, so that the distance between the upper edge of the fourth region in which the target object on the third image is located and the upper edge of the third image falls within the first distance range. If the ratio is relatively small, and the distance between the lower edge of the fourth region in which the target object on the remaining image is located and the lower edge of the remaining image is relatively large, the electronic device crops the remaining image to obtain the fourth image, so that the distance between the lower edge of the fourth region in which the target object on the fourth image is located and the lower edge of the remaining image falls within the second distance range. In this manner, the electronic device can automatically crop an image. In addition, a region in which a target object on a cropped image is located is not far from an edge of the image, and the target object is relatively centered.

In a possible design, after the cropping out an image part that is of the second image and that is moved out of the first region, the method further includes: determining a ratio of a width of a remaining image on the second image to a width of a fourth region in which the target object on the remaining image is located; and if the ratio is greater than a third threshold, cropping the remaining image to obtain a fifth image.

A first ratio of a first distance between an upper edge of the fourth region in which the target object on the fifth image is located and an upper edge of the fifth image to a second distance between a lower edge of the fourth region in which the target object on the fifth image is located and a lower edge of the fifth image is equal to a second ratio of a third distance between the upper edge of the fourth region in which the target object on the remaining image is located and an upper edge of the remaining image to a fourth distance between the lower edge of the fourth region in which the target object on the remaining image is located and a lower edge of the remaining image.

In this embodiment of this application, after cropping the second image, the electronic device may further continue to crop the remaining image. For example, if the ratio of the width of the remaining image to the width of the fourth region in which the target object on the remaining image is located is relatively large, the electronic device crops the remaining image to obtain the fifth image. The first ratio of the first distance between the upper edge of the fourth region in which the target object on the fifth image is located and the upper edge of the fifth image to the second distance between the lower edge of the fourth region in which the target object on the fifth image is located and the lower edge of the fifth image is equal to the second ratio of the third distance between the upper edge of the fourth region in which the target object on the remaining image is located and the upper edge of the remaining image to the fourth distance between the lower edge of the fourth region in which the target object on the remaining image is located and the lower edge of the remaining image. In this manner, after cropping an original image, the electronic device can keep, as much as possible, a location proportion of a target object on a cropped image equal to a location proportion of the target object on the original image.

In a possible design, the electronic device may further correspondingly store the first image and the second image. When detecting an operation used to open the second image, the electronic device displays the second image. An identifier is displayed on the second image, and when the identifier is triggered, the first image is displayed.

In this embodiment of this application, after cropping the first image to obtain the second image, the electronic device correspondingly stores the first image and the second image. If the electronic device displays the second image, the user may quickly open the first image by using the identifier on the second image, thereby facilitating a user operation.

According to a second aspect, an embodiment of this application further provides an image cropping method, where the method may be performed by an electronic device, and the method includes: obtaining a first image; determining at least two target curves of a first region in which the first image is located, where an area of the first region is equal to an area of the first image; determining a center line of a second region in which a target object on the first image is located, where the second region is an external polygon of the target object; determining a first target curve that is in the at least two target curves and that is closest to the center line of the second region; determining a target size, where the target size is a size of an image obtained after the first image is cropped; and cropping the first image based on the target size and the first target curve, to obtain a second image, where a size of the second image is equal to the target size, a second target curve of a third region in which the second image is located is close to or overlaps the first target curve, the second target curve corresponds to the first target curve, and an area of the third region is equal to an area of the second image.

In this embodiment of this application, the electronic device determines the target object on the first image, determines the first target curve closest to the center line of the target object from a plurality of target curves of the first image, and crops the image based on the target size and the first target curve, so that a cropped image meets the target size, and the second target curve of the cropped image is close to or overlaps the second target curve. In this manner, if a center line of a target object on an original image is close to a first target curve in a region in which the original image is located, a second target curve of a region in which a cropped image is located is close to or overlaps the first target curve. Because the first target curve corresponds to the second target curve, the cropped image keeps a proportion of the original image as much as possible.

In a possible design, the target object is at least one preset object, the target object is at least one object specified by a user on the first image, or the target object is at least one object automatically determined by the electronic device based on a plurality of objects on the first image.

In this embodiment of this application, the target object may be preset, may be specified by the user, or may be automatically identified by the electronic device. This is not limited in this embodiment of this application.

In a possible design, the first target curve is a center line, a golden section line, or a rule of thirds line of the first region, where when the first target curve is the center line of the first region, the second target curve is a center line of the third region; when the first target curve is the golden section line of the first region, the second target curve is a golden section line of the third region; or when the first target curve is the rule of thirds line of the first region, the second target curve is a rule of thirds line of the third region.

In this embodiment of this application, the first target curve may be the center line, the golden section line, the rule of thirds line, or the like of the first region. The second target curve corresponds to the first target curve. Therefore, when the first target curve is the center line of the first region, the second target curve is a center line of the third region; when the first target curve is the golden section line of the first region, the second target curve is a golden section line of the third region; or when the first target curve is the rule of thirds line of the first region, the second target curve is a rule of thirds line of the third region.

In a possible design, if the first image includes N persons, the target object is N faces, the second region is a minimum external rectangle of N face boxes in which the N faces are located, and the third region is the minimum external rectangle of the N face boxes in which the N faces are located.

In this embodiment of this application, the electronic device may crop a group portrait, and the group portrait includes a plurality of persons. In this case, the target object is a plurality of faces, and the second region in which the target object is located may be a minimum external rectangle of a plurality of face boxes. In this manner, the electronic device can automatically crop the group portrait, so that a cropped group portrait includes all faces as much as possible. In addition, if a center line of the minimum external rectangle of the plurality of face boxes on the original image is close to a first target curve of a region in which the original image is located, a second target curve of a region in which the cropped image is located is close to or overlaps the first target curve. Because the first target curve corresponds to the second target curve, the cropped image keeps a proportion of the original image as much as possible.

In a possible design, the electronic device may further determine a ratio of a width of the second image to a width of a fourth region in which the target object on the second image is located. If the ratio is greater than a first threshold, and a distance between an upper edge of the fourth region in which the target object on the second image is located and an upper edge of the second image is greater than a first preset distance, the electronic device crops the second image to obtain a third image, so that a distance between the upper edge of the fourth region in which the target object on the third image is located and an upper edge of the third image falls within a first distance range. If the ratio is less than or equal to the first threshold, and a distance between a lower edge of the fourth region in which the target object on the second image is located and a lower edge of the second image is greater than a second preset distance, the electronic device crops the second image to obtain a fourth image, so that a distance between the lower edge of the fourth region in which the target object on the fourth image is located and a lower edge of the fourth image falls within a second distance range.

In this embodiment of this application, after cropping the first image to obtain the second image, the electronic device may further continue to crop the second image. For example, if the ratio of the width of the second image to the width of the fourth region in which the target object on the second image is located is relatively large, and the distance between the upper edge of the fourth region in which the target object on the second image is located and the upper edge of the second image is relatively large, the electronic device crops the second image to obtain the third image, so that the distance between the upper edge of the fourth region in which the target object on the third image is located and the upper edge of the third image falls within the first distance range. If the ratio is relatively small, and the distance between the lower edge of the fourth region in which the target object on the second image is located and the lower edge of the second image is relatively large, the electronic device crops the second image to obtain the fourth image, so that the distance between the lower edge of the fourth region in which the target object on the fourth image is located and the lower edge of the second image falls within the second distance range. In this manner, the electronic device can automatically crop an image. In addition, a region in which a target object on a cropped image is located is not far from an edge of the image, and the target object is relatively centered.

In a possible design, the electronic device may further determine a ratio of a width of the second image to a width of a fourth region in which the target object on the second image is located; and if the ratio is greater than a third threshold, crop the second image to obtain a fifth image. A first ratio of a first distance between an upper edge of the fourth region in which the target object on the fifth image is located and an upper edge of the fifth image to a second distance between a lower edge of the fourth region in which the target object on the fifth image is located and a lower edge of the fifth image is equal to a second ratio of a third distance between the upper edge of the fourth region in which the target object on the second image is located and an upper edge of the second image to a fourth distance between the lower edge of the fourth region in which the target object on the second image is located and a lower edge of the second image.

In this embodiment of this application, after cropping the first image to obtain the second image, the electronic device may further continue to crop the second image. For example, if the ratio of the width of the second image to the width of the fourth region in which the target object on the second image is located is relatively large, the electronic device crops the second image to obtain the fifth image. The first ratio of the first distance between the upper edge of the fourth region in which the target object on the fifth image is located and the upper edge of the fifth image to the second distance between the lower edge of the fourth region in which the target object on the fifth image is located and the lower edge of the fifth image is equal to the second ratio of the third distance between the upper edge of the fourth region in which the target object on the second image is located and the upper edge of the second image to the fourth distance between the lower edge of the fourth region in which the target object on the second image is located and the lower edge of the second image. In this manner, after cropping an original image, the electronic device can keep, as much as possible, a location proportion of a target object on a cropped image equal to a location proportion of the target object on the original image.

In a possible design, the electronic device may further correspondingly store the first image and the second image. When detecting an operation used to open the second image, the electronic device displays the second image. An identifier is displayed on the second image, and when the identifier is triggered, the first image is displayed.

In this embodiment of this application, after cropping the first image to obtain the second image, the electronic device correspondingly stores the first image and the second image. If the electronic device displays the second image, the user may quickly open the first image by using the identifier on the second image, thereby facilitating a user operation.

According to a third aspect, an embodiment of this application further provides an electronic device. The electronic device includes a processor and a memory. The memory is configured to store a first image and one or more computer programs. When the one or more computer programs stored in the memory are executed by the processor, the electronic device is enabled to implement the technical solution in the first aspect and any possible design of the first aspect. Alternatively, when the one or more computer programs stored in the memory are executed by the processor, the electronic device is enabled to implement the technical solution in the second aspect and any possible design of the second aspect.

According to a fourth aspect, an embodiment of this application further provides an electronic device. The electronic device includes modules/units that perform the method in the first aspect or any possible design of the first aspect. Alternatively, the electronic device includes modules/units that perform the method in the second aspect or any possible design of the second aspect. These modules/units may be implemented by hardware, or may be implemented by hardware by executing corresponding software.

According to a fifth aspect, an embodiment of this application provides a chip. The chip is coupled to a memory in an electronic device, to perform the technical solution in the first aspect of the embodiments of this application and any possible design of the first aspect. Alternatively, the chip is coupled to a memory in an electronic device, to perform the technical solution in the second aspect of the embodiments of this application and any possible design of the second aspect. In this embodiment of this application, "coupling" means that two components are directly or indirectly combined with each other.

According to a sixth aspect, an embodiment of this application provides a computer readable storage medium. The computer readable storage medium includes a computer program. When the computer program is run on an electronic device, the electronic device is enabled to perform the technical solution in the first aspect of the embodiments of this application and any possible design of the first aspect. Alternatively, when the computer program is run on an electronic device, the electronic device is enabled to perform the technical solution in the second aspect of the embodiments of this application and any possible design of the second aspect.

According to a seventh aspect, an embodiment of this application provides a program product, including instructions. When the program product is run on an electronic device, the electronic device is enabled to perform the technical solution in the first aspect of the embodiments of this application and any possible design of the first aspect. Alternatively, when the program product is run on an electronic device, the electronic device is enabled to perform the technical solution in the second aspect of the embodiments of this application and any possible design of the second aspect.

BRIEF DESCRIPTION OF DRAWINGS

FIG. 5(a) to FIG. 5(c) are a schematic diagram of a first target curve and a second target curve according to an embodiment of this application;

FIG. 6(a) is a schematic diagram of an image cropping process according to an embodiment of this application;

FIG. 7 is a schematic diagram of type division and a processing manner of an image of a portrait type according to an embodiment of this application;

FIG. 8(a) to FIG. 8(c) are a schematic diagram of cropping an image of a close-up portrait type according to an embodiment of this application;

FIG. 9(a) to FIG. 9(c) are a schematic diagram of cropping an image of a close-up portrait type according to an embodiment of this application;

FIG. 10(a) to FIG. 10(c) are a schematic diagram of cropping an image of a bust type according to an embodiment of this application;

FIG. 11(a) to FIG. 11(c) are a schematic diagram of cropping an image of a bust type according to an embodiment of this application;

FIG. 12 is a schematic flowchart of an image cropping method according to an embodiment of this application;

FIG. 18(a) and FIG. 18(b) are a schematic diagram of an image cropping process according to an embodiment of this application.

DESCRIPTION OF EMBODIMENTS

Figure 1:
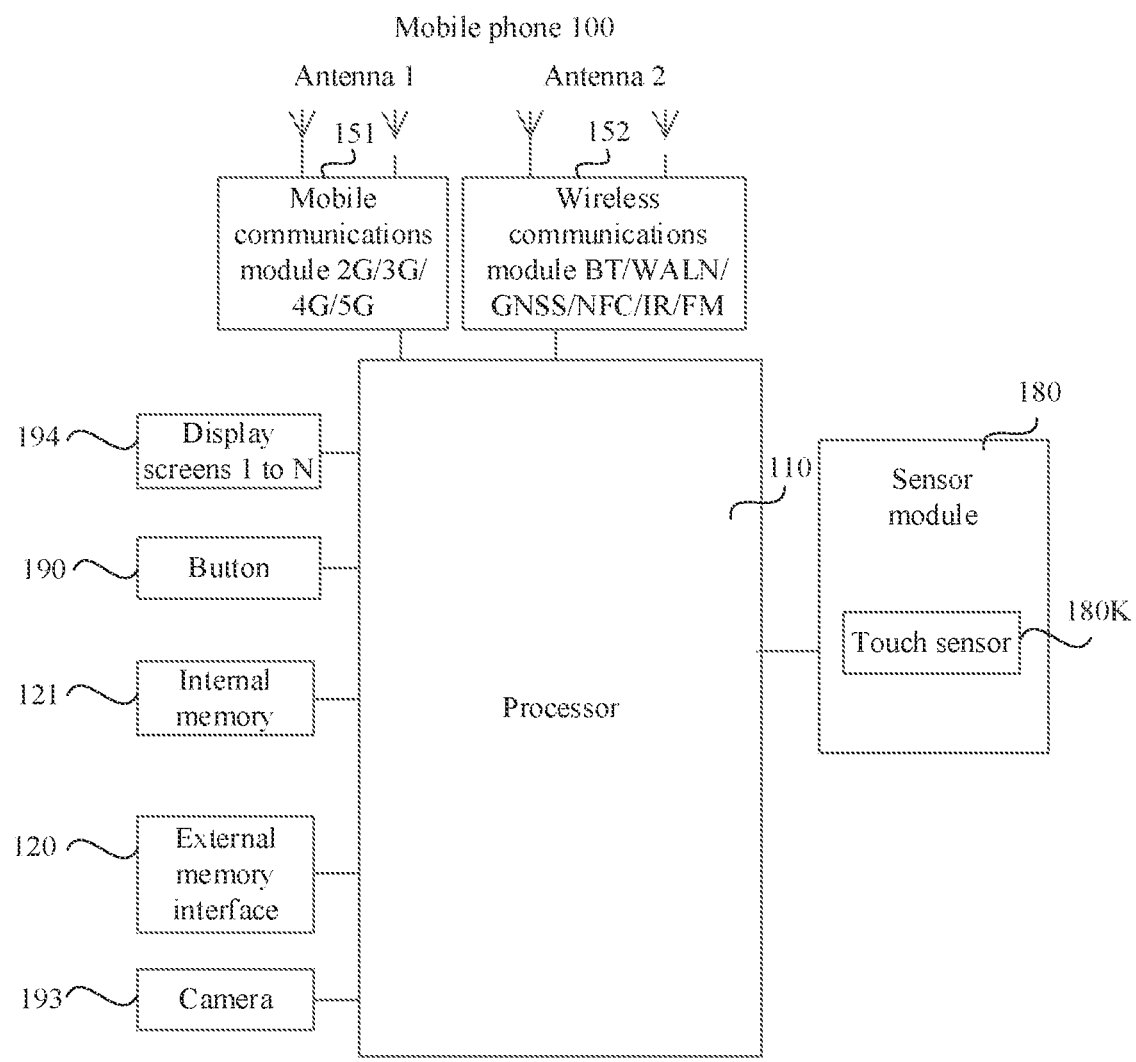
FIG. 1 is a schematic structural diagram of a mobile phone 100 according to an embodiment of this application.

The following describes the technical solutions in the embodiments of this application with reference to the accompanying drawings in the embodiments of this application.

In the following, some terms of the embodiments of this application are described, so as to help persons skilled in the art have a better understanding.

A terminal device in the embodiments of this application is an electronic device that can crop an image. One or more application programs may be installed in the terminal device, and the application program is a computer program that can implement one or more specific functions, for example, a camera application, an album application, WeChat, Tencent chat software (QQ), WhatsApp Messenger, Line (Line), instagram (instagram), KakaoTalk, and DingTalk. An application program mentioned below may be an application program installed on the terminal device at delivery, or may be an application program downloaded by a user from a network side in a process of using the terminal device. An image cropping method provided in the embodiments of this application may be applied to one or more application programs. For example, the image cropped method provided in the embodiments of this application may be applied to the album application to crop an image.

It should be noted that a process of cropping an image by using the image cropping method provided in the embodiments of this application is referred to as "intelligent cropping" below.

An image in the embodiments of this application may be a picture, or may be only a set of image parameters (the image parameter is, for example, a pixel value, definition, and a color). This is not limited in the embodiments of this application.

A curve in the embodiments of this application may be a straight line, or may be another curve such as an arc. This is not limited in the embodiments of this application.

"A plurality of" in the embodiments of this application means being greater than or equal to two.

It should be noted that, the term "and/or" in this specification describes only an association relationship for describing associated objects and represents that three relationships may exist. For example, A and/or B may represent the following three cases: Only A exists, both A and B exist, and only B exists. In addition, unless otherwise specified, the character "/" in this specification generally indicates an "or" relationship between the associated objects. In the description of the embodiments of the present invention, terms such as "first" and "second" are used only for distinguishing between descriptions, cannot be understood as an indication or implication of relative importance, and cannot be understood as an indication or implication of a sequence.

The following describes a terminal device, a graphical user interface (graphical user interface, GUI) used in such a terminal device, and an embodiment in which such a terminal device is used. In some embodiments of this application, the terminal device may be a portable terminal, such as a mobile phone, a tablet computer, or a wearable device (such as a smart watch) that has a wireless communication function. The portable terminal includes a component (such as a processor) that can collect an image and intelligently crop the collected image. An example embodiment of a portable terminal includes but is not limited to a portable terminal using iOS®, Android®, Microsoft®, or another operating system. The foregoing portable terminal may be another portable terminal, provided that an image can be collected and the collected image can be intelligently cropped. It should be further understood that, in some other embodiments of this application, the foregoing terminal device may not be a portable terminal, but is a desktop computer that can collect an image and intelligently crop the collected image.

In some other embodiments of this application, the terminal device may not need to have an image collection function, but has a communication function, that is, the terminal device may receive an image sent by another device, and intelligently crop the received image. The another device may be a network side device. For example, the terminal device downloads an image from a network, or the terminal device receives, by using a WeChat application or another communication application, an image sent by the another device.

In some other embodiments of this application, the terminal device may not need to have an intelligent image cropping function, but has a communication function. For example, after collecting an image, the terminal device may send the image to another device such as a server. The another device intelligently crops the image by using the image cropping method provided in the embodiments of this application, and sends a cropped image to the terminal device.

An example in which the terminal device is a mobile phone is used. FIG. 1 is a schematic structural diagram of a mobile phone 100.

The mobile phone 100 may include a processor 110, an external memory interface 120, an internal memory 121, an antenna 1, an antenna 2, a mobile communications module 151, a wireless communications module 152, a sensor module 180, a button 190, a display screen 194, a camera 193, and the like. The sensor module 180 may include a touch sensor 180K and the like (the mobile phone 100 may further include another sensor such as a distance sensor, a fingerprint sensor, a temperature sensor, an ambient light sensor, and a gyroscope sensor that are not shown in the figure).

It may be understood that the schematic structure in this embodiment of this application constitutes no specific limitation on the mobile phone 100. In some other embodiments of this application, the mobile phone 100 may include more or fewer components than those shown in the figure, combine some components, or split some components, or have different component arrangements. The components shown in the figure may be implemented by using hardware, software, or a combination of software and hardware.

The following describes the components in the mobile phone 100 shown in FIG. 1.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The controller may be a nerve center and a command center of the mobile phone 100. The controller may generate an operation control signal based on instruction operation code and a time sequence signal, to complete control of instruction reading and instruction execution.

A memory may be further disposed in the processor 110, to store instructions and data. In some embodiments, the memory in the processor 110 is a cache. The memory may store instructions or data that is just used or cyclically used by the processor 110. If the processor 110 needs to use the instruction or the data again, the processor 110 may directly invoke the instruction or the data from the memory, to avoid repeated access, and reduce a waiting time of the processor 110, thereby improving system efficiency.

The processor 110 may run software code of an image cropping algorithm provided in the embodiments of this application, to execute the following image cropping process. A specific image cropping process is described later.

The internal memory 121 may be configured to store computer executable program code, and the executable program code includes instructions. The processor 110 runs the instruction stored in the internal memory 121, to perform various function applications of the mobile phone 100 and data processing. The internal memory 121 may include a program storage region and a data storage region. The program storage region may store an operating system and software code of an application program (for example, a camera application, an album application, or a WeChat application). The data storage region may store personal data (for example, an image existing before cropping or a cropped image) created in a process of using the mobile phone 100.

The internal memory 121 may further store software code of the image cropping method provided in the embodiments of this application. When the processor 110 runs the code, the following image cropping process is executed to implement an intelligent image cropping function.

The internal memory 121 may further store other content. For example, the internal memory 121 stores face feature information, and the processor 110 may identify a face on a to-be-processed image (or may be referred to as a to-be-cropped image) based on the face feature information.

The internal memory 121 may further store an image obtained after cropping. For example, the cropped image and an original image (namely, an image existing before cropping) may be correspondingly stored. For example, after detecting an indication used to open the original image, the mobile phone 100 displays the original image, and a mark may be displayed on the original image. When the mark is triggered, the mobile phone 100 opens the cropped image (the image obtained after the original image is cropped). Alternatively, after detecting an indication used to open the cropped image, the mobile phone 100 displays the cropped image, and a mark is displayed on the cropped image. When the mark is triggered, the mobile phone 100 opens the original image (the original image corresponding to the cropped image).

For example, the internal memory 121 may further store a type to which an image belongs. For example, the type to which the image belongs may include a super close-up portrait type, a bust portrait type, a half-length portrait type, a seven-division portrait type, a nine-division portrait type, and an environmental portrait type. The internal memory 121 may further store a determining condition of a type to which each image belongs and software code corresponding to a processing manner of each image type. Specific content is described later.

It should be understood that the internal memory 121 may further store other content mentioned below, for example, values of d1 to d5.

The internal memory 121 may include a high-speed random access memory, and may further include a nonvolatile memory such as at least one magnetic disk memory, a flash memory, or a universal flash storage (universal flash storage, UFS).

The external memory interface 120 is configured to connect an external memory to the mobile phone 100. The external memory includes an external storage card (SD storage card), a NAS storage device, and the like. This is not limited in this embodiment of this application. To save storage space of the internal memory 121, the mobile phone 100 may store the software code of the image cropping method provided in the embodiments of this application, the cropped image, and the like into the external memory. The processor 110 may access, by using the external memory interface 120, data stored in the external memory.

The following describes a function of the sensor module 180.

The touch sensor 180K is also referred to as a "touch panel". The touch sensor 180K may be disposed on the display screen 194, and the touch sensor 180K and the display screen 194 constitute a touchscreen that is also referred to as a "touchscreen". The touch sensor 180K is configured to detect a touch operation performed on or near the touch sensor 180K. The touch sensor 180K may transfer the detected touch operation to the processor 110 to determine a type of a touch event, and may provide visual output related to the touch operation by using the display screen 194. In some other embodiments, the touch sensor 180K may be disposed on a surface of the mobile phone 100, and is at a location different from a location of the display screen 194.

The touch sensor 180K may assist the processor 110 in image cropping. A home screen displayed on the touchscreen of the mobile phone 100 is used as an example. The home screen includes icons of a plurality of applications, such as an album application and a camera application. The touch sensor 180K may detect a touch operation of a user on the touchscreen, and send the touch operation to the processor 110. The processor 100 may determine an icon corresponding to the touch operation based on the touch operation, that is, determine an application that the user is to tap. Assuming that the processor 110 determines, based on the touch operation, that the user taps the album application, the mobile phone 100 displays an image included in the album application. When detecting an operation of taping one image by the user, the touch sensor 180K displays the image. When the touch sensor 180K detects an operation used to crop the image, the processor 110 runs the software code of the image cropping method provided in the embodiments of this application, to crop the image. The mobile phone 100 displays a cropped image.

Similarly, the mobile phone 100 may further receive an input operation by using the button 190, and send the input operation to the processor 110. The processor 110 determines an icon corresponding to the input operation, for example, an album application.

The camera 193 is configured to capture a static image or a video. Generally, the camera 193 may include a photosensitive element such as a lens group and an image sensor. The lens group includes a plurality of lenses (a convex lens or a concave lens), configured to collect an optical signal reflected by a to-be-photographed object, and transfer the collected optical signal to the image sensor. The image sensor generates an image of the to-be-photographed object based on the optical signal.

A home screen displayed on the touchscreen of the mobile phone 100 is used as an example. The home screen includes icons of a plurality of applications, such as an album application and a camera application. The touch sensor 180K may detect a touch operation of the user on the touchscreen, and send the touch operation to the processor 110. The processor 100 may determine an icon corresponding to the touch operation based on the touch operation, that is, determine an application that the user is to tap. Assuming that the processor 110 determines, based on the touch operation, that the user taps a camera application, the processor 110 starts the camera application, displays a framing interface, and starts the camera 193, so that the camera 193 captures an image, and displays the image in the framing interface. Certainly, the framing interface further includes a photographing control. When the touch sensor 180K detects an operation used to trigger the photographing control, the camera 193 collects an image, and stores the collected image into the internal memory 121.

The display screen 194 is configured to display an image, a video, and the like. The display screen 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a microLED, a micro-OLED, a quantum dot light emitting diode (quantum dot light emitting diodes, QLED), and the like. In some embodiments, the mobile phone 100 may include one or N display screens 194, and N is a positive integer greater than 1.

The display screen 194 is configured to display a home screen, or display a display interface of an application, for example, a display interface of an album application. The display screen 194 may be further configured to display an image, such as an image existing before cropping and a cropped image.

A wireless communication function of the mobile phone 100 may be implemented by using the antenna 1, the antenna 2, the mobile communications module 151, the wireless communications module 152, the modem processor, the baseband processor, and the like.

The antenna 1 and the antenna 2 are configured to transmit and receive an electromagnetic wave signal. Each antenna in the mobile phone 100 may be configured to cover one or more communication frequency bands. Different antennas may be further multiplexed to improve utilization of the antennas. For example, the antenna 1 may be multiplexed as a diversity antenna of a wireless local area network. In some other embodiments, the antenna may be used in combination with a tuning switch.

The mobile communications module 151 may provide a solution to wireless communication such as 2G/3G/4G/5G applied to the mobile phone 100. The mobile communications module 151 may include at least one filter, a switch, a power amplifier, a low noise amplifier (low noise amplifier, LNA), and the like. The mobile communications module 151 may receive an electromagnetic wave by using the antenna 1, perform processing such as filtering and amplification on the received electromagnetic wave, and transmit a processed electromagnetic wave to the modem processor for demodulation. The mobile communications module 151 may further amplify a signal modulated by the modem processor, and convert the signal into an electromagnetic wave for radiation by using the antenna 1. In some embodiments, at least some function modules of the mobile communications module 151 may be disposed in the processor 110. In some embodiments, at least some function modules of the mobile communications module 151 and at least some modules of the processor 110 may be disposed in a same component.

The modem processor may include a modulator and a demodulator. The modulator is configured to modulate a to-be-sent low-frequency baseband signal into a medium-and-high frequency signal. The demodulator is configured to demodulate a received electromagnetic wave signal into a low-frequency baseband signal. Subsequently, the demodulator transmits the low-frequency baseband signal obtained through demodulation to the baseband processor for processing. After the low-frequency baseband signal is processed by the baseband processor, the low-frequency baseband signal is transmitted to the application processor. The application processor outputs a sound signal by using an audio device (which is not limited to a loudspeaker, a telephone receiver, and the like), or displays an image or a video by using the display screen 194. In some embodiments, the modem processor may be an independent component. In some other embodiments, the modem processor may be independent of the processor 110, and is disposed in a same component as the mobile communications module 151 or another function module.

The wireless communications module 152 may provide a solution to wireless communication applied to the mobile phone 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communications module 152 may be one or more components into which at least one communication processing module is integrated. The wireless communications module 152 receives an electromagnetic wave by using the antenna 2, performs frequency modulation and filtering processing on an electromagnetic wave signal, and sends a processed signal to the processor 110. The wireless communications module 152 may further receive a to-be-sent signal from the processor 110, perform frequency modulation and amplification on the signal, and convert the signal into an electromagnetic wave for radiation by using the antenna 2.

In some embodiments of this application, the mobile phone 100 may receive, by using the mobile communications module 151 or the wireless communications module 152, an image sent by another device, and the processor 110 crops the received image. Alternatively, the mobile phone 100 sends an image to another device by using the mobile communications module 151 or the wireless communications module 152, where the another device crops the image, and then the mobile phone 100 receives a cropped image sent by the another device.

Although not shown in FIG. 1, the mobile phone 100 may further include an audio module such as a loudspeaker, a telephone receiver, and a microphone; may further include a motor, configured to generate a vibration prompt (for example, an incoming call vibration prompt); and may further include an indicator such as an indicator light, configured to indicate a charging state and a power change, and also configured to indicate a message, a missed call, a notification, and the like.

Figure 2:
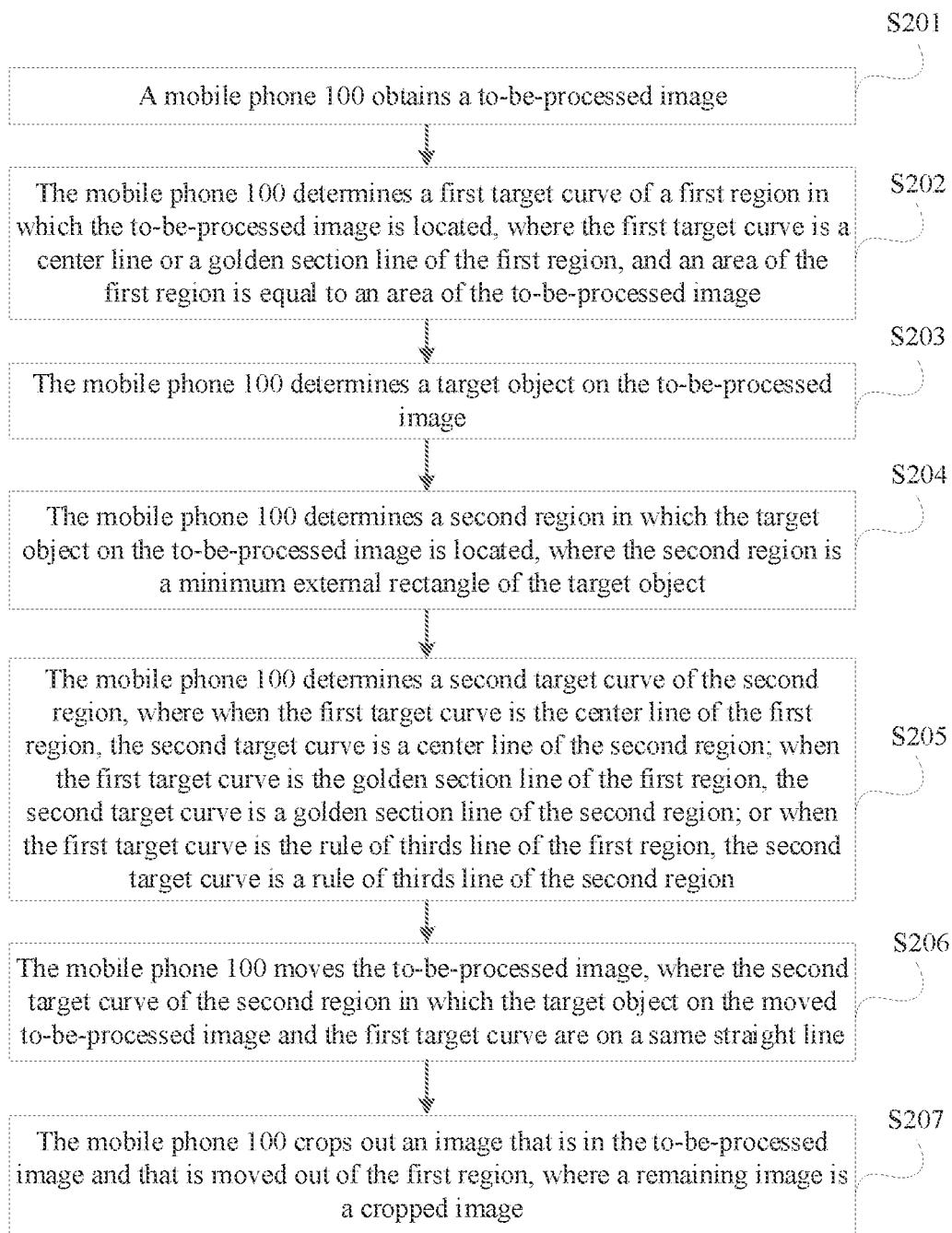
FIG. 2 is a schematic flowchart of an image cropping method according to an embodiment of this application.

The following describes a process of the image cropping method provided in the embodiments of this application. FIG. 2 is a schematic flowchart of an image cropping method according to an embodiment of this application. The method may be applied to the mobile phone 100 shown in FIG. 1 or another device. An example in which the method is applied to the mobile phone 100 shown in FIG. 1 is used below. For example, software code of the method may be stored in the internal memory 121. The processor 110 of the mobile phone 100 runs the software code, to implement the image cropping process shown in FIG. 2. As shown in FIG. 2, the process of the method includes the following steps.

S201. The mobile phone 100 obtains a to-be-processed image.

There are a plurality of manners of obtaining the to-be-processed image by the mobile phone 100. For example, the mobile phone 100 collects an image by using a camera application, the mobile phone 100 receives an image sent by another device, or the mobile phone 100 downloads an image from a network side.

S202. The mobile phone 100 determines a first target curve of a first region in which the to-be-processed image is located, where the first target curve is a center line or a golden section line of the first region, and an area of the first region is equal to an area of the to-be-processed image.

For example, the mobile phone 100 may determine a size (namely, a size of the first region) of the to-be-processed image, and then determine the first target curve of the first region based on the size of the to-be-processed image. The first target curve is a center line, a golden section line, a rule of thirds line, or the like of the first region.

Figure 3:
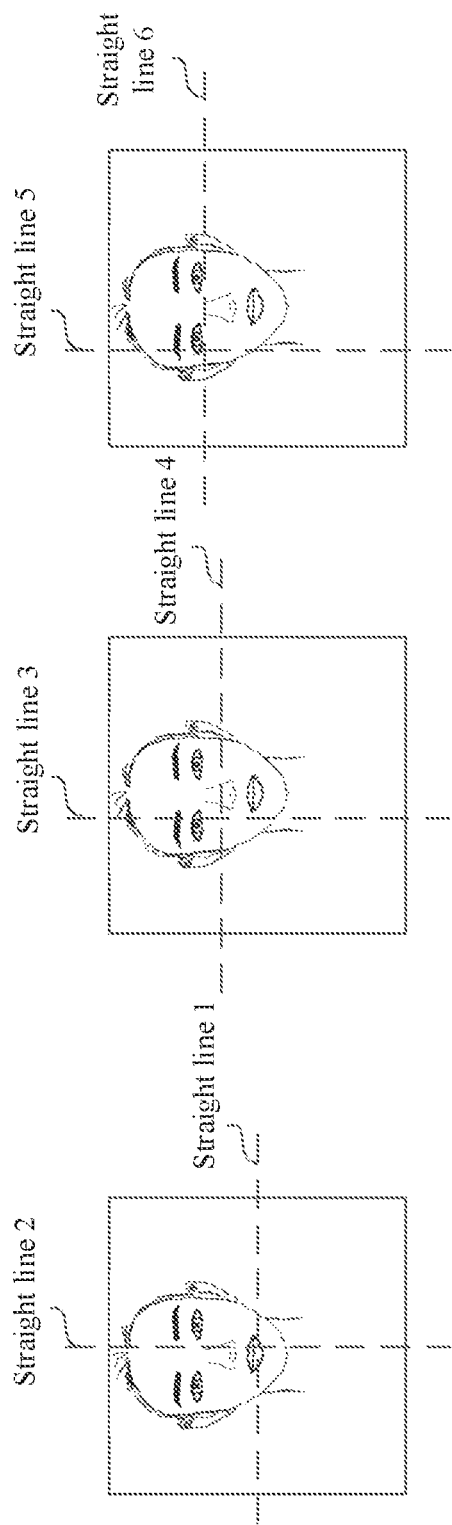
FIG. 3(*a*) to FIG. 3(*c*) are a schematic diagram of a first target curve according to an embodiment of this application.

For example, FIG. 3(*a*) to FIG. 3(*c*) are a schematic diagram of a center line, a golden section line, and a rule of thirds line of a first region in which a to-be-processed image is located according to an embodiment of this application. The center line is a straight line that passes through a center of the first region and that is perpendicular to an edge of an image. Therefore, there may be two center lines. Referring to FIG. 3(*a*), a straight line 1 and a straight line 2 are center lines. The golden section line is a straight line that divides the first region into two regions, where a ratio (a ratio between lengths of the two regions, a ratio between widths of the two regions, or a ratio between areas of the two regions) between the two regions is a golden ratio, namely, a golden section line. Referring to FIG. 3(*b*), a straight line 3 and a straight line 4 are golden section lines. The rule of thirds line is a straight line that divides an image into two regions, where a ratio between the two regions is one third. Referring to FIG. 3(*c*), a straight line 5 and a straight line 6 are rule of thirds lines.

It should be noted that the center line, the golden section line, and the rule of thirds line are used as an example in this embodiment of this application. In actual application, there may be another curve, such as a four-division line. This is not limited in this embodiment of this application.

S203. The mobile phone 100 determines a target object on the to-be-processed image.

In this embodiment of this application, the target object may be a face or another object on the to-be-processed image. For example, the target object may be specified by a user. For example, the mobile phone 100 displays an image. The user taps a regional target object on the image, or determines the target object in another manner. This is not limited in this embodiment of this application. For example, the target object may be automatically identified by the mobile phone 100. For example, the mobile phone 100 automatically identifies a face on the to-be-processed image based on face feature information.

It should be understood that the target object may be one or more faces. One face is first used as an example for description below. A manner of processing a plurality of faces, namely, a group portrait, is described later.

S204. The mobile phone 100 determines a second region in which the target object on the to-be-processed image is located, where the second region is an external polygon of the target object, and the external polygon may be an external rectangle or the like.

For example, when the target object is a face, the second region is a face box in which the face is located.

Figure 4:
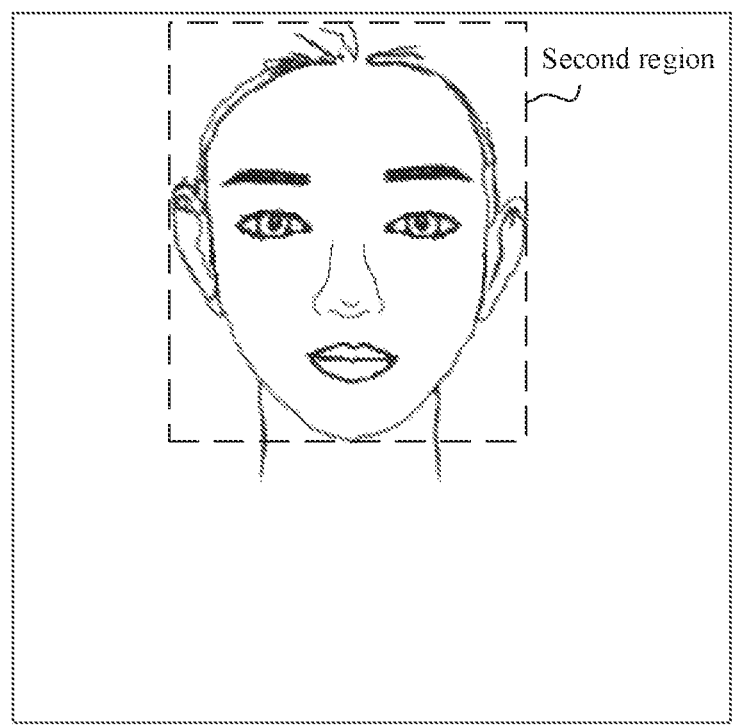
FIG. 4 is a schematic diagram of a face box on an image according to an embodiment of this application.

For example, the second region in which the target object is located is tangent to an edge of the target object. For example, the second region may be a minimum external rectangle of the target object. FIG. 4 is a schematic diagram of a second region in which a target object is located according to an embodiment of this application. As shown in FIG. 4, the target object is a face, and the second region in which the face is located is a region surrounded by a dashed line box, that is, the second region is a face box.

S205. The mobile phone 100 determines a second target curve of the second region, where when the first target curve is the center line of the first region, the second target curve is a center line of the second region; when the first target curve is the golden section line of the first region, the second target curve is a golden section line of the second region; or when the first target curve is the rule of thirds line of the first region, the second target curve is a rule of thirds line of the second region.

FIG. 5(a) to FIG. 5(c) show a second target curve of a second region in which a target object is located according to an embodiment of this application. FIG. 5(a) shows the center line of the second region in which the target object is located, namely, a straight line 7 and a straight line 8. FIG. 5(b) shows the golden section line of the second region in which the current object is located, namely, a straight line 9 and a straight line 10. FIG. 5(c) shows the rule of thirds line of the second region in which the target object is located, namely, a straight line 11 and a straight line 12.

S206. The mobile phone 100 moves the to-be-processed image, where the second target curve of the second region in which the target object on the moved to-be-processed image is located is close to or overlaps the first target curve. For example, if both the first target curve and the second target curve are straight lines, the first target curve and the second target curve may be on a same straight line.

Still referring to FIG. 5(a) to FIG. 5(c), the straight line 7 in FIG. 5(a) is used as an example. Referring to FIG. 6(a), the mobile phone 100 moves the to-be-processed image, so that the straight line 7 and the straight line 1 are located on a same straight line after movement. It may be learned from FIG. 6(a) that, after the mobile phone 100 moves the to-be-processed image, a partial region in the first region, namely, a rectangle surrounded by a solid line in FIG. 6(a), in which the to-be-processed image is originally located becomes a blank region. Referring to FIG. 6(a), after the mobile phone 100 moves downwards the region in which the target object is located, an upper region has no image, and is a blank region. In addition, a partial image in the to-be-processed image is moved out of the first region.

S207. The mobile phone 100 crops out an image that is in the to-be-processed image and that is moved out of the first region, where a remaining image is a cropped image.

Still referring to FIG. 6(a), the mobile phone 100 crops the image that is moved out of the first region. Therefore, the remaining image is the cropped image.

It should be noted that in the foregoing embodiment, an example in which the first target curve and the second target curve are horizontal center lines is used. That is, a horizontal center line of the second region in which the target object on the cropped image is located and a horizontal center line of the first region occupied by the image existing before cropping are on a same straight line. However, as shown in FIG. 5(a) to FIG. 5(c), the first target curve and the second target curve may be golden section lines, rule of thirds lines, or the like. Therefore, before cropping an image, the mobile phone 100 may determine which target curve needs to be used.

For example, FIG. 5(a) is still used as an example. The mobile phone 100 may determine a distance 1 between the straight line 7 and the straight line 1 and a distance 2 between the straight line 8 and the straight line 2, and determine a maximum distance in the distance 1 and the distance 2. Assuming that the distance 1 between the straight line 7 and the straight line 1 is the maximum distance, the mobile phone 100 moves the to-be-processed image, so that the straight line 7 of the second region in which the target object is located and the straight line 1 are on a same straight line after the movement. Assuming that the distance 2 between the straight line 8 and the straight line 2 is the maximum distance, the mobile phone 100 moves the to-be-processed image, so that the straight line 8 of the second region in which the target object is located and the straight line 2 are on a same straight line after the movement.

A reason is that if the distance 1 between the straight line 7 and the straight line 1 is the maximum distance, it indicates that the target object is far away from a center location, and the target object is excessively close to the top or the bottom. Therefore, the mobile phone 100 may move the to-be-processed image downwards or upwards, so that the target object on the moved image is relatively centered.

If the distance 2 between the straight line 8 and the straight line 2 is the maximum distance, it indicates that the target object is far away from the center location, and the target object is excessively close to the left or the right. Therefore, the mobile phone 100 may move the to-be-processed image leftwards or rightwards, so that the target object on the moved image is relatively centered.

In this example, the mobile phone 100 determines whether the horizontal center line or a vertical center line is used. The mobile phone 100 may determine, in a similar manner, whether a horizontal golden section line or a vertical golden section line is used. The mobile phone may determine, in a similar manner, whether a horizontal rule of thirds line or a vertical rule of thirds line is used.

For another example, the mobile phone 100 may determine all target curves of the first region. FIG. 5(a) to FIG. 5(c) are used as an example. The mobile phone 100 may determine six straight lines of the first region and six straight lines of the second region in which the target object is located. The mobile phone 100 may determine a distance 1 between the straight line 7 and the straight line 1, a distance 2 between the straight line 8 and the straight line 2, a distance 3 between the straight line 9 and the straight line 3, a distance 4 between the straight line 10 and the straight line 4, a distance 5 between the straight line 11 and the straight line 5, and a distance 6 between the straight line 12 and the straight line 6, and then determine a maximum distance in the distance 1 to the distance 6. The mobile phone 100 determines the maximum distance in the distance 1 to the distance 6. Assuming that the distance 6 is the maximum distance, the horizontal rule of thirds line is used, that is, a horizontal rule of thirds line of a region in which the target object on the cropped image is located and the straight line 6 are located on a same straight line. Assuming that the distance 1 is the maximum distance, the horizontal center line is used, that is, a horizontal center line of a region in which the target object on the cropped image is located and the straight line 1 are located on a same straight line.

For example, the mobile phone 100 may use the center line by default, use the golden section line by default, or use the rule of thirds line by default. Certainly, the user may specify use of the center line, the golden section line, or the rule of thirds line. This is not limited in this embodiment of this application.

It may be learned from the foregoing embodiment that when cropping the image, the mobile phone 100 may move the region in which the target object is located to a relatively center location. In this manner, the target object on the cropped image is at a relatively middle location, and the target object is emphasized.

In the above-described embodiment, the target object may be any object on an image. The following describes another embodiment. In this embodiment, a manner in which the mobile phone 100 crops a special type of image, namely, an image of a portrait type, is described. The image of the portrait type is an image including a person.

In some embodiments, the mobile phone 100 may determine a type to which the image of the portrait type belongs.

Different cropping manners may be used for different types. For example, the mobile phone 100 may determine a ratio of a height of an image to a height of a face, and determine, based on the ratio, a type to which the image belongs. FIG. 4 is used as an example. The height of the image may be a width (namely, a width of the first region) of the image, and the height of the face may be a width of the face box (the dashed line box in the figure).

For example, the type to which the image belongs may include a super close-up portrait type, a bust portrait type, a half-length portrait type, a seven-division portrait type, a nine-division portrait type, and an environmental portrait type. If the height of the image is less than 1 time of the height of the face, that is, the ratio is less than 1, the image belongs to the super close-up portrait type. If the height of the image is 1 time to 1.5 times the height of the face, the image belongs to a close-up portrait type. If the height of the image is 1.5 times to 3 times the height of the face, the image belongs to the bust portrait type. If the height of the image is 3 times to 5 times the height of the face, the image belongs to the half-length portrait type. If the height of the image is 5 times to 7 times the height of the face, the image belongs to the seven-division portrait type. If the height of the image is 7 times to 9 times the height of the face, the image belongs to the nine-division portrait type. If the height of the image is greater than 9 times of the height of the face, the image belongs to the environmental portrait type.

FIG. 7 is a schematic diagram of a type to which an image belongs and a determining condition and a processing manner of each type according to an embodiment of this application. As shown in the figure, the type to which the image belongs may include the super close-up portrait type, the bust portrait type, the half-length portrait type, the seven-division portrait type, the nine-division portrait type, the environmental portrait type, and the like.

The super close-up portrait type means that an area of a face on an image is relatively large, and the image is a partial close-up of the face. In this case, the mobile phone 100 may crop the image, so that the eyes on a cropped image are at a relatively center location.

Generally, a scenario of the super close-up portrait type includes an ID photo, a partial close-up of a face (for example, a selfie of the face), and the like.

The close-up portrait type may have two cropping manners that are separately described below:

For example, FIG. 8(a) to FIG. 8(c) are a schematic diagram of a cropping process of an image of a close-up portrait type according to an embodiment of this application. As shown in FIG. 8(a), the mobile phone 100 determines that an image belongs to the close-up portrait type, and the image occupies a first region. Referring to FIG. 8(b), the mobile phone 100 may move the image, so that a distance between the bottom of a face box on the moved image and the bottom of the first region is equal to d1. Then, the mobile phone 100 crops out an image that is moved out of the first region. Referring to FIG. 8(c), after the image that is moved out of the first region is cropped out, a remaining image is a cropped image, and a distance between the bottom of a region in which a face on the cropped image is located and the bottom of the image is equal to d1.

For another example, referring to FIG. 9(b), an image is located in a first region, and the mobile phone 100 identifies a point (for example, a center of a region in which the forehead is located) on the forehead on a face on the image, a point on the left shoulder, and a point on the right shoulder, and establishes a triangle based on the three points. Referring to FIG. 9(b), the mobile phone 100 moves the image, so that a distance between a bottom edge of the triangle on the moved image and a bottom edge of the first region is d2. Referring to FIG. 9(c), the mobile phone 100 may crop out an image that is moved out of the first region, and a remaining image is a cropped image. In this manner, the mobile phone 100 can perform cropping according to the triangle rule, so that the distance between the bottom edge of the face triangle on the cropped image and the bottom edge of the image is d2. In this manner, for the close-up portrait type, the neck and the face of a person may be reserved, and a visual beauty is presented.

The bust portrait type may have a plurality of processing manners, for example,

For example, the mobile phone 100 may crop an image based on the Fibonacci curve, so that a cropped image meets the Fibonacci curve. FIG. 10(a) is a schematic diagram of the Fibonacci curve. FIG. 10(b) shows an image existing before cropping. The mobile phone 100 may apply the Fibonacci curve to the image. Specifically, the mobile phone 100 may move a first tangent of the Fibonacci curve shown in FIG. 10(a) to a location of the eyes on a face in FIG. 10(b), and then change a size of the Fibonacci curve (for example, scale up or down the curve), so that a second tangent is tangent to the chin on the face. In this way, referring to FIG. 10(b), the mobile phone 100 may crop the image based on a third tangent, a fourth tangent, a fifth tangent, and a sixth tangent. In this way, referring to FIG. 10(c), edges of a cropped image are respectively tangent to the third tangent, the fourth tangent, the fifth tangent, and the sixth tangent.

For another example, referring to FIG. 11(a), an image is located in a first region, and the mobile phone 100 may identify a face on the image and mark a face box. Referring to FIG. 11(b), the mobile phone 100 may move the image, so that a distance between the top of the face box on the moved image and the top of the first region is greater than or equal to d3 or falls within a distance range. Referring to FIG. 11(c), the mobile phone 100 crops out an image that is moved out of the first region, and a remaining image is a cropped image.

For the half-length portrait type, the mobile phone 100 may also use a manner similar to that of the image of the bust portrait type. For example, for the half-length portrait type, the mobile phone 100 may move an image, so that a distance between the top of a face box on the moved image and the top of the image is greater than or equal to d4 or falls within a distance range.

For an image of the seven-division portrait type, the mobile phone 100 may also use a manner similar to that of the image of the bust portrait type. For example, for the image of the seven-division portrait type, the mobile phone 100 may move the image, so that a distance between the top of a face box on the moved image and the top of the image is greater than or equal to d5 or falls within a distance range.

A manner of processing the nine-division portrait type by the mobile phone 100 is a composition continuation principle. The composition continuation principle is described later.

The nine-division portrait type means that an area of a face on an image is smaller and an area of a landscape is larger. The mobile phone 100 may identify a face box, and then determine distances a, b, c, and d between the face box and edges of the image. The distance a is a distance between a left edge of the face box and a left edge of the image, the distance b is a distance between a right edge of the face box and a right edge of the image, the distance c is a distance between an upper edge of the face box and an upper edge of the image, and the distance d is a distance between a lower edge of the face box and a lower edge of the image. The mobile phone 100 determines a first ratio of a/b and a second ratio of c/d. After the mobile phone 100 crops the image, the edges of the face box on a cropped image and the edges of the image still meet the first ratio and the second ratio. That is, a ratio a1/b1 of a distance a1 between the left edge of the face box on the cropped image and the left edge of the image to a distance b1 between the right edge of the face box and the right edge of the image is still equal to the first ratio, and a ratio c1/d1 of a distance c1 between the upper edge of the face box and the upper edge of the image to a distance d1 between the lower edge of the face box and the lower edge of the image is still equal to the second ratio.

It should be noted that, in the foregoing process, keeping relevant ratios of a cropped image equal to relevant ratios of an image existing before cropping is the composition continuation principle.

It should be understood that for the image of the nine-division portrait type, a size of an image obtained after the mobile phone 100 performs cropping may be determined by the mobile phone 100, or may be specified by the user, provided that the cropped image meets the composition continuation principle.

For the environmental portrait type, the mobile phone 100 may also perform cropping by using the composition continuation principle, and details are not described again.

It should be noted that the composition continuation principle is not mentioned when the super close-up portrait type, the bust portrait type, the half-length portrait type, the seven-division portrait type, or the like is described above. In actual application, the composition continuation principle may also be used in the super close-up portrait type, the bust portrait type, the half-length portrait type, the seven-division portrait type, or the like. This is not limited in this embodiment of this application.

It should be noted that in the foregoing descriptions, values of d1 to d5 may be the same or different. In addition, the values of d1 to d5 may be determined by a designer based on an experiment, and are set and stored in the mobile phone 100 before delivery of the mobile phone 100. Certainly, the values of d1 to d5 may be customized by the user. This is not limited in this embodiment of this application.

It should be noted that the technical features in the foregoing embodiment may be combined to implement different technical effects. For example, the mobile phone 100 may first crop an image by using the process shown in FIG. 2, and then continue to crop a cropped image, namely, a remaining image, by using the process shown in FIG. 7. This is not limited in this embodiment of this application.

In the foregoing embodiment, an example in which an image includes one person is used. The following describes another embodiment. In this embodiment, a group portrait (namely, an image including at least two persons) is used as an example to describe an image cropping process of the group portrait.

FIG. 12 is a schematic flowchart of another image cropping manner according to an embodiment of this application. As shown in FIG. 12, the process includes the following steps.

S1201. The mobile phone 100 determines a face box in which each face of all faces on a to-be-processed image is located, where N is an integer greater than or equal to 2.

Figure 13A:
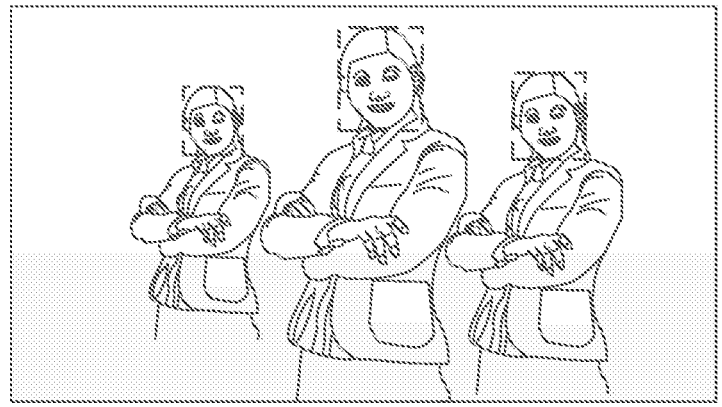
FIG. 13(a) to FIG. 13(e) are a schematic diagram of a process of cropping an image of a group portrait type according to an embodiment of this application.

For example, FIG. 13(a) to FIG. 13(e) show a cropping process of a group portrait according to an embodiment of this application. As shown in FIG. 13(a), the image includes three persons (it should be noted that, for ease of understanding, an example in which the three persons on the image are the same is used in FIG. 13(a) to FIG. 13(e), and in actual application, the three persons on the image are different persons). The mobile phone 100 identifies a face box in which each face on the image is located, for example, three dashed line boxes in FIG. 13(a).

S1202. The mobile phone 100 sets a rectangular box, where the rectangular box is an external rectangle (or a minimum enclosure rectangle) of a first face box, and the first face box is a face box with a largest area in all the face boxes.

Figure 13B:
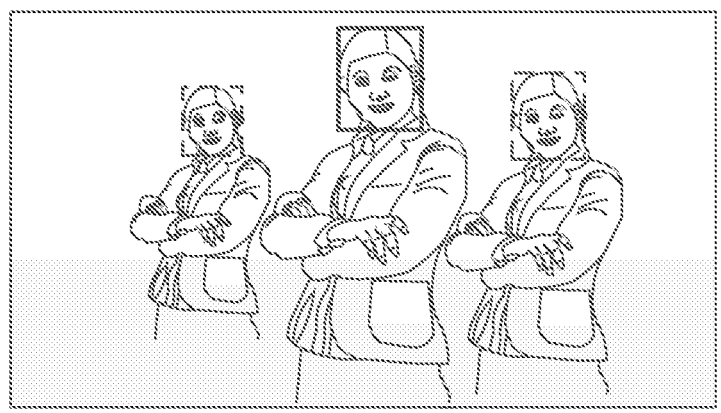

Referring to FIG. 13(b), the mobile phone 100 may sort all the face boxes based on areas. For example, in FIG. 13(a) to FIG. 13(e), a face box in the middle has a largest area, and is referred to as the first face box. A face box on the right has an area second only to that of the first face box, and is referred to as a second face box. A face box on the left has a smallest area, and is referred to as a third face box.

For example, referring to FIG. 13(b), the mobile phone 100 sets the rectangular box (a solid line box in the figure). Because the face box in FIG. 13(a) is also rectangular, the rectangular box, namely, the solid line box, that is set by the mobile phone 100 overlaps the face box with the largest area.

It should be understood that an example in which the face box is a rectangular box is used in FIG. 13(a) to FIG. 13(e). In actual application, the face box may not be a rectangular box. In this case, the rectangular box that is set by the mobile phone 100 may be an external rectangle of the face box.

S1203. The mobile phone 100 adjusts a size of the rectangular box, so that an adjusted rectangular box is a minimum external rectangle (or a minimum enclosure rectangle) of the first face box and the second face box, where an area of the second face box is a face box with a largest area in face boxes other than the first face box.

Figure 13C:
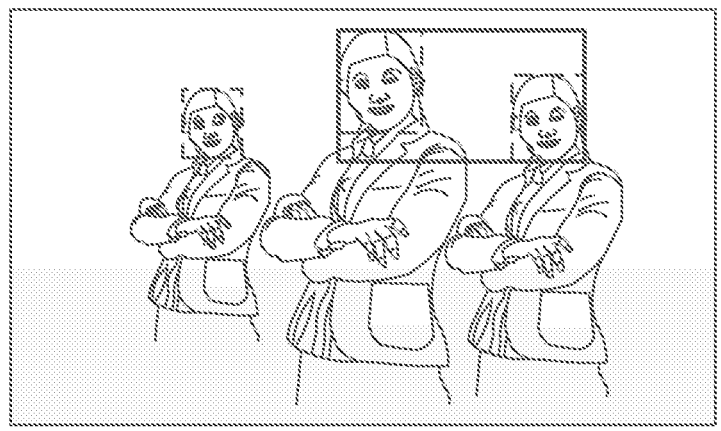

For example, referring to FIG. 13(c), the mobile phone 100 adjusts the rectangular box, so that the adjusted rectangular box includes the first face box and the second face box.

It should be noted that after the mobile phone 100 adjusts the rectangular box, the adjusted rectangular box is the external rectangle of the first face box and the second face box, that is, edges of the adjusted rectangular box are tangent to both the first face box and the second face box.

S1204. The mobile phone 100 continues to adjust the size of the rectangular box, so that an adjusted rectangular box is finally a minimum external rectangle (or a minimum enclosure rectangle) of all the face boxes.

Figure 13D:
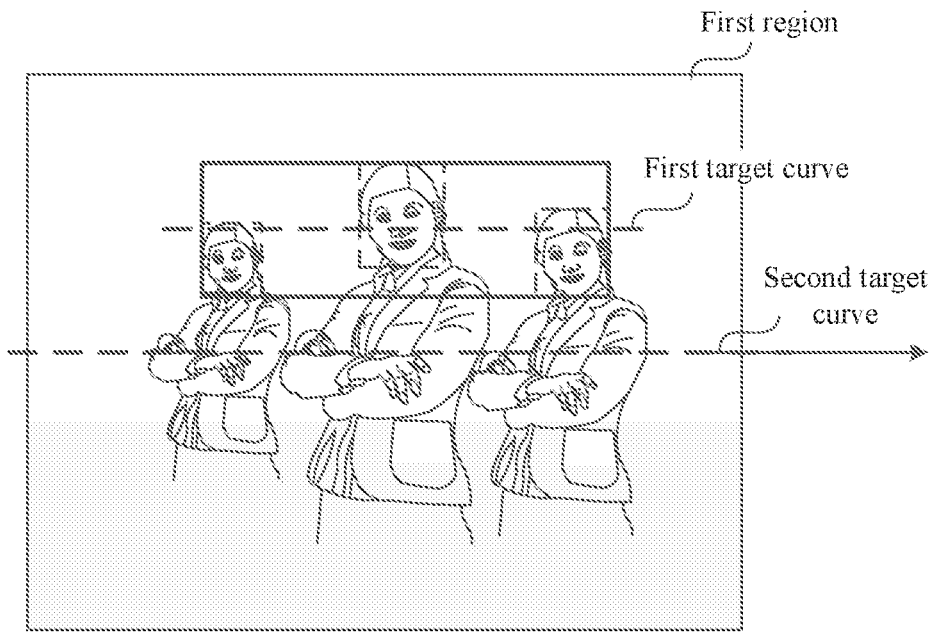

For example, referring to FIG. 13(d), the mobile phone 100 continues to adjust the size of the rectangular box, so that the rectangular box includes all the face boxes, and is the minimum external rectangle of all the face boxes.

S1205. The mobile phone 100 determines a first target curve of the finally adjusted rectangular box, where the first target curve is a center line, a golden section line, a rule of thirds line, or the like of the finally adjusted rectangular box.

For example, an example in which the first target curve is a center line is used. References can be made to a horizontal dashed line shown in FIG. 13(d).

S1206. The mobile phone 100 determines a second target curve of a first region in which the to-be-processed image is located, where when the first target curve is the center line, the second target curve is a center line of the first region; when the first target curve is the golden section line, the second target curve is a golden section line of the first region; or when the first target curve is the rule of thirds line, the second target curve is a rule of thirds line of the first region.

S1207. The mobile phone 100 moves the to-be-processed image, so that the first target curve of the finally adjusted rectangular box and the second target curve are located on a same straight line.

Figure 13E:
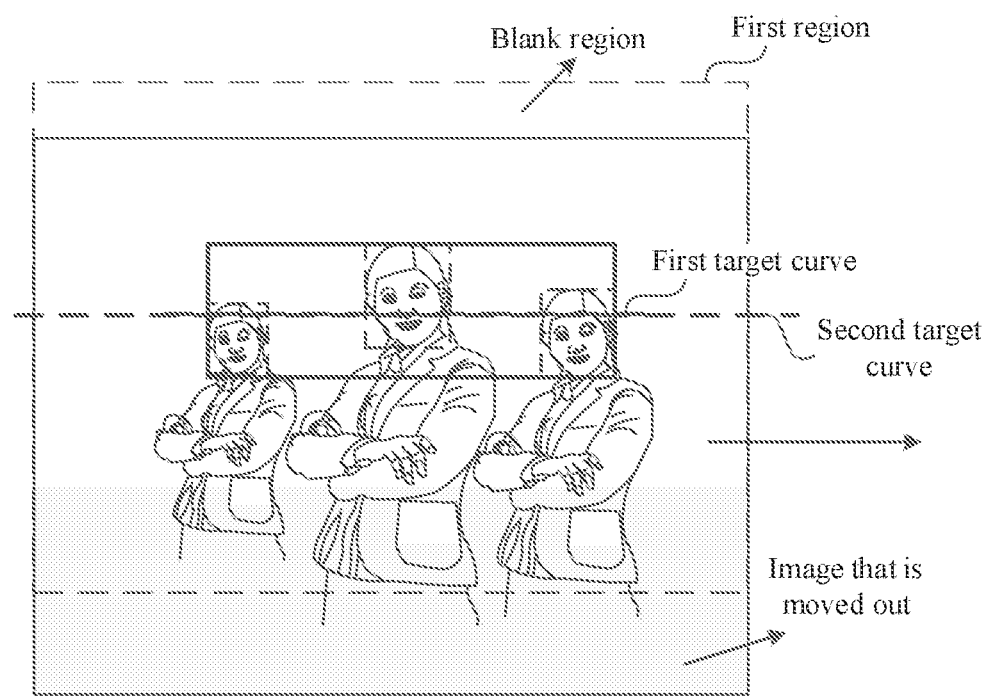

For example, referring to FIG. 13(e), the mobile phone 100 moves the finally adjusted rectangular box, so that the first target curve of the finally adjusted rectangular box and the second target curve are located on a same straight line. After the mobile phone 100 moves the to-be-processed image, a part of a region in which the to-be-processed image is originally located is a blank region, and a part of image is moved out of the region in which the to-be-processed image is originally located.

S1208. The mobile phone 100 crops out an image that is moved out of the first region, to obtain a cropped image.

For example, still referring to FIG. 13(e), the mobile phone 100 may crop out the image that is moved out of the region in which the to-be-processed image is originally located, and a remaining image is the cropped image. In this manner, the face box in the group portrait is displayed at a relatively middle location on the cropped image.

In the embodiment shown in FIG. 12 and FIG. 13(a) to FIG. 13(e), a horizontal center line is used as an example, that is, a horizontal center line of the rectangular box on the cropped image and a horizontal center line of the first region are on a same straight line. However, the first target curve and the second target curve may be golden section lines, rule of thirds lines, or the like. Therefore, before cropping an image, the mobile phone 100 may determine which target curve needs to be used.

For example, FIG. 13(d) is used as an example. The mobile phone 100 may determine a distance 1 between the horizontal center line of the rectangular box (the minimum external rectangle of the three face boxes) and the horizontal center line of the first region and a distance 2 between a vertical center line of the rectangular box and a vertical center line of the first region. If the distance 1 is greater than the distance 2, the mobile phone 100 uses the horizontal center line, that is, the mobile phone 100 moves the image, so that the horizontal center line of the rectangular box on the moved image and the horizontal center line of the first region are located on a same straight line.

In this example, the mobile phone 100 determines whether the horizontal center line or the vertical center line is used. The mobile phone 100 may determine, in a similar manner, whether a horizontal golden section line or a vertical golden section line is used. The mobile phone may determine, in a similar manner, whether a horizontal rule of thirds line or a vertical rule of thirds line is used.

For another example, the mobile phone 100 may determine all target curves of the rectangular box (the minimum external rectangle of the three face boxes). FIG. 13(d) is used as an example. The mobile phone 100 may determine six straight lines of the rectangular box and six straight lines of the first region. The six straight lines of the rectangular box are in a one-to-one correspondence with the six straight lines of the first region. For example, a distance between the horizontal center line of the rectangular box and the horizontal center line of the first region is a distance 1, a distance between a vertical center line of the rectangular box and a vertical center line of the first region is a distance 2, a distance between a horizontal golden section line of the rectangular box and a horizontal golden section line of the first region is a distance 3, a distance between a vertical golden section line of the rectangular box and a vertical golden section line of the first region is a distance 4, a distance between a horizontal rule of thirds line of the rectangular box and a horizontal rule of thirds line of the first region is a distance 5, and a distance between a vertical rule of thirds line of the rectangular box and a vertical rule of thirds line of the first region is a distance 6.

The mobile phone 100 may determine a maximum distance value in the six distance values from the distance 1 to the distance 6. Assuming that the distance 6 is the maximum distance value, the vertical rule of thirds line is used. Assuming that the distance 1 is the maximum distance value, the horizontal center line is used.

For example, the mobile phone 100 may use the center line by default, use the golden section line by default, or use the rule of thirds line by default. Certainly, a user may specify use of the center line, the golden section line, or the rule of thirds line. This is not limited in this embodiment of this application.

In the foregoing embodiments, two cropping processes are described. For example, FIG. 2 to FIG. 6(a) show a first cropping manner that is referred to as horizontal cropping below for ease of distinguishing. FIG. 7 to FIG. 11(c) show another cropping manner that is referred to as vertical cropping below for ease of distinguishing. In actual application, the mobile phone 100 may determine whether to use the horizontal cropping manner or the vertical cropping manner.

For example, the mobile phone 100 may compare the size of the to-be-processed image with a target size of a target image (namely, a cropped image), and determine, based on a comparison result, whether to use horizontal cropping or vertical cropping.

The size of the target image may be specified by the user (for example, the user manually moves or scales up or down a size of a cropping box), or may be determined by the mobile phone 100 based on different cropping scenarios. For example, when the mobile phone 100 detects an operation used to indicate that an image is used as a lock screen wallpaper of the mobile phone 100, a size of a lock screen interface of the mobile phone 100 is the size of the target image. For another example, when the mobile phone 100 detects an operation used to indicate that an image is uploaded as a cover of WeChat Moments, a size of the cover of the WeChat Moments is the size of the target image. Certainly, in actual application, there are other scenarios in which an image needs to be cropped. The scenarios are not listed one by one in this embodiment of this application.

Figure 14A:
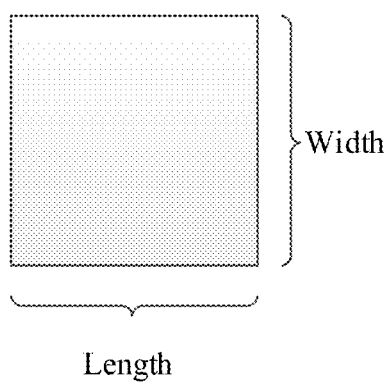
FIGS. 14(a) and 14(b) are schematic diagrams of a target size and an original size according to an embodiment of this application.
Figure 14B:
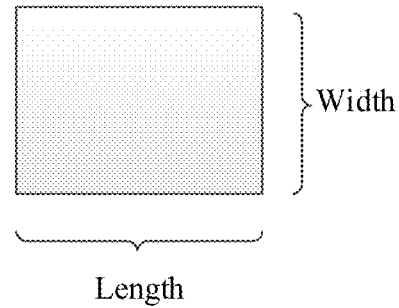

For example, referring to FIG. 14(a), assuming that an aspect ratio of the to-be-processed image is 1:1 and an aspect ratio of the target image is 4:3, the square to-be-processed image is cropped to obtain a rectangular image whose aspect ratio is 4:3. Therefore, the mobile phone 100 may use the horizontal cropping manner. Referring to FIG. 14(b), assuming that an aspect ratio of the to-be-processed image is 1:1 and an aspect ratio of the target image is 3:4, the square to-be-processed image is cropped to obtain a rectangular image whose aspect ratio is 3:4. Therefore, the mobile phone 100 may use the vertical cropping manner.

In the foregoing embodiments, an implementation (namely, the implementation shown in FIG. 7) of vertical cropping and an implementation (namely, the implementation shown in FIG. 2) of horizontal cropping have been described. The following describes several other implementations of horizontal cropping.

Figure 15:
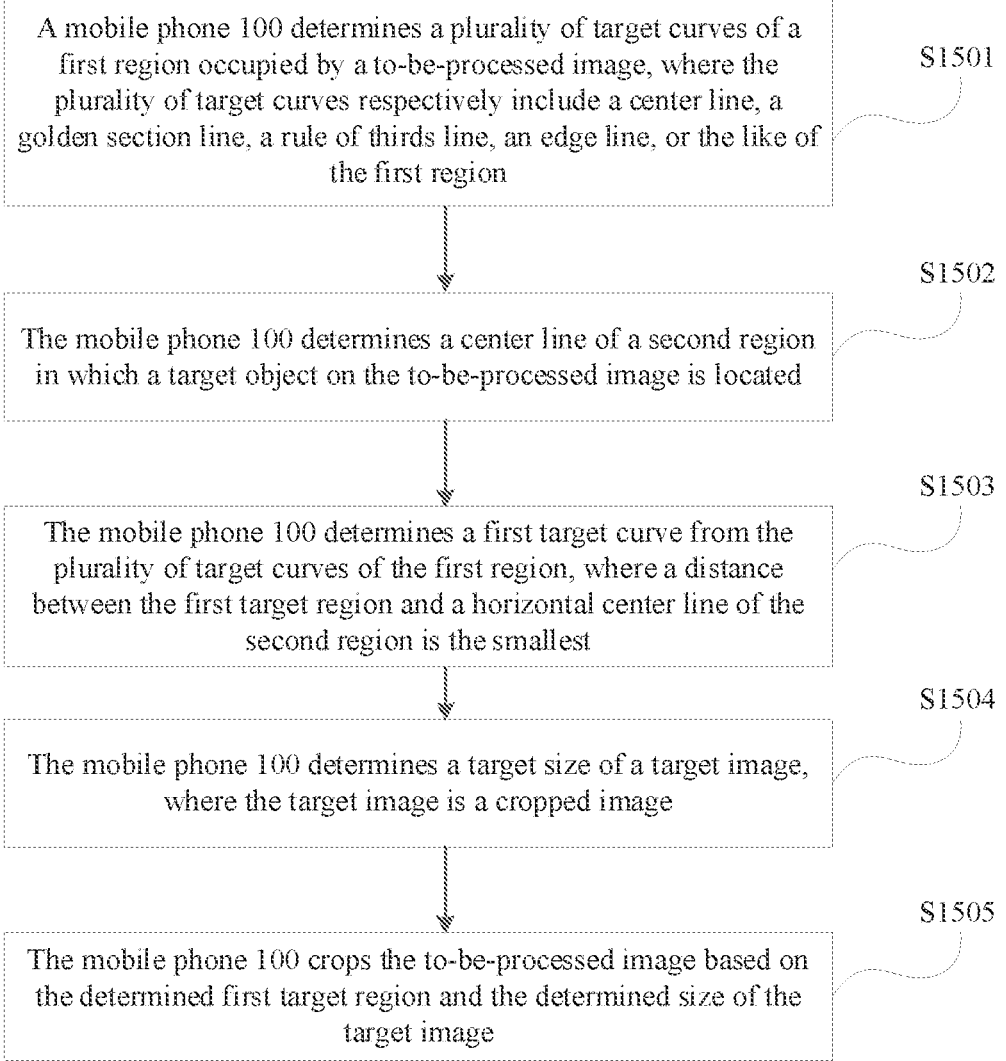
FIG. 15 is a schematic flowchart of an image cropping method according to an embodiment of this application.

In a first possible implementation, FIG. 15 is a schematic flowchart of an image cropping method according to an embodiment of this application. As shown in FIG. 15, the process includes the following steps.

S1501. The mobile phone 100 determines a plurality of target curves of a first region occupied by a to-be-processed image, where the plurality of target curves respectively include a center line, a golden section line, a rule of thirds line, an edge line, or the like of the first region.

Figures 16A, 16B:
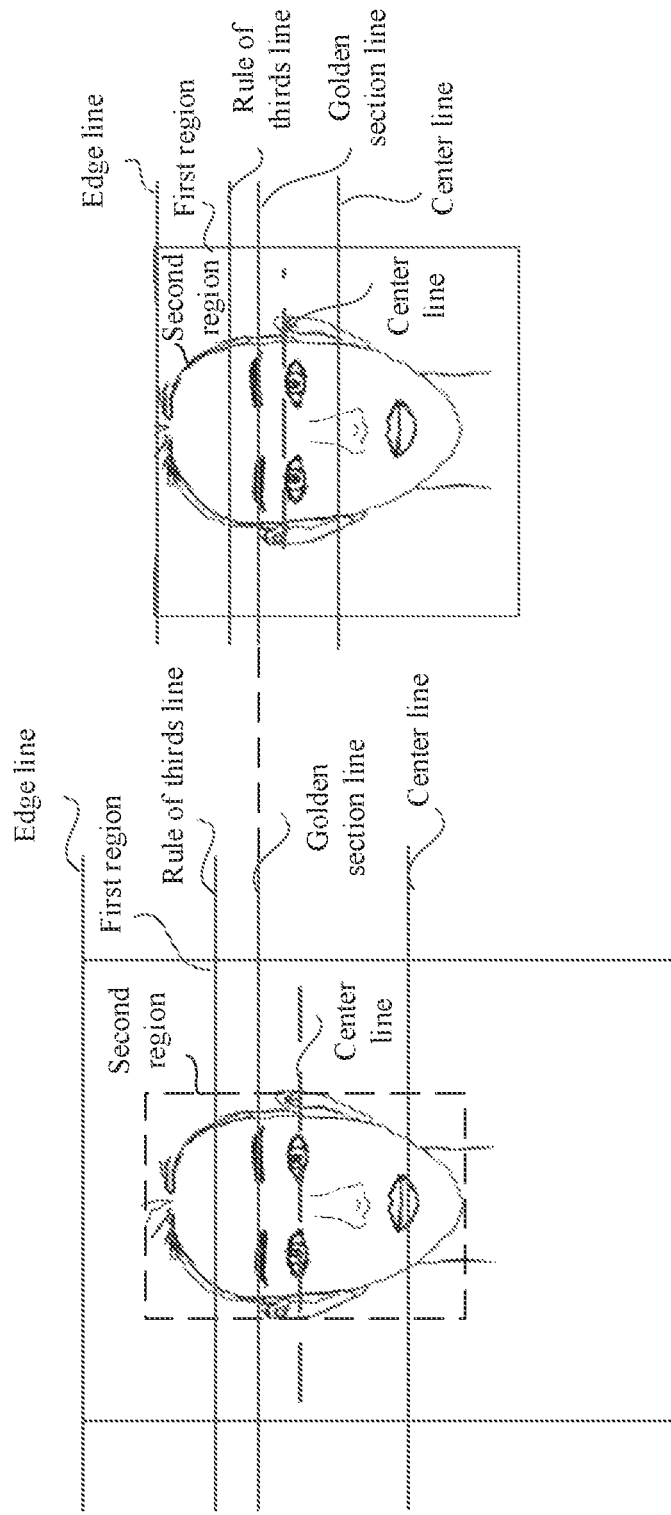
FIG. 16(a) and FIG. 16(b) are a schematic diagram of an image cropping process according to an embodiment of this application.

For example, referring to FIG. 16(a), solid lines are the plurality of target curves of the first region occupied by the to-be-processed image.

S1502. The mobile phone 100 determines a center line of a second region in which a target object on the to-be-processed image is located.

For example, still referring to FIG. 16(a), a dashed line is a horizontal center line of the second region in which the target object is located.

It should be understood that the target object may be specified by a user, or may be automatically determined by the mobile phone 100 based on a plurality of objects on the to-be-processed image. This is not limited in this embodiment of this application.

S1503. The mobile phone 100 determines a first target curve from the plurality of target curves of the first region, where a distance between the first target region and the horizontal center line of the second region is the smallest.

For example, referring to FIG. 16(a), the mobile phone 100 may determine a solid line closest to the dashed line (the horizontal center line of the second region) from the plurality of solid lines (the plurality of target curves of the first region). The solid line is the first target curve. For example, as shown in FIG. 16(a), if the golden section line is closest to the dashed line, the golden section line is the determined first target curve.

S1504. The mobile phone 100 determines a target size of a target image, where the target image is a cropped image.

For example, the target size of the target image may be specified by the user, or may be determined by the mobile phone 100 based on a cropping scenario. A process of determining the target size of the target image by the mobile phone 100 based on the cropping scenario has been described above, and details are not described herein again.

S1505. The mobile phone 100 crops the to-be-processed image based on the determined first target region and the determined size of the target image.

For example, referring to FIG. 16(a), after determining that the golden section line is closest to a center line of a face box, the mobile phone 100 may crop the image based on the golden section line and the target size. Assuming that a size of the to-be-processed image is 1200*1200 and the target size of the target image is 400*300, the mobile phone 100 may crop the to-be-processed image to obtain an image whose size is 400*300, so that the original golden section line is still at a location of a golden section line on the cropped image. For example, referring to FIG. 16(b), the golden section line (a golden section line of a third region in which the cropped image is located) on the cropped image and the original rule of thirds line (the golden section line of the first region) are on a same straight line, and a size of the cropped image meets the target size.

In the embodiment shown in FIG. 16(a) and FIG. 16(b), a center of the target object on an image existing before cropping is approximately at the golden section line on the image. In this case, the center of the target object on the cropped image is still approximately at the golden section line on the cropped image, that is, a location proportion of the target object on the cropped image is the same as a location proportion of the target object on the image existing before cropping. Therefore, the cropped image may preserve an intention of the original image as much as possible.

Figure 17:
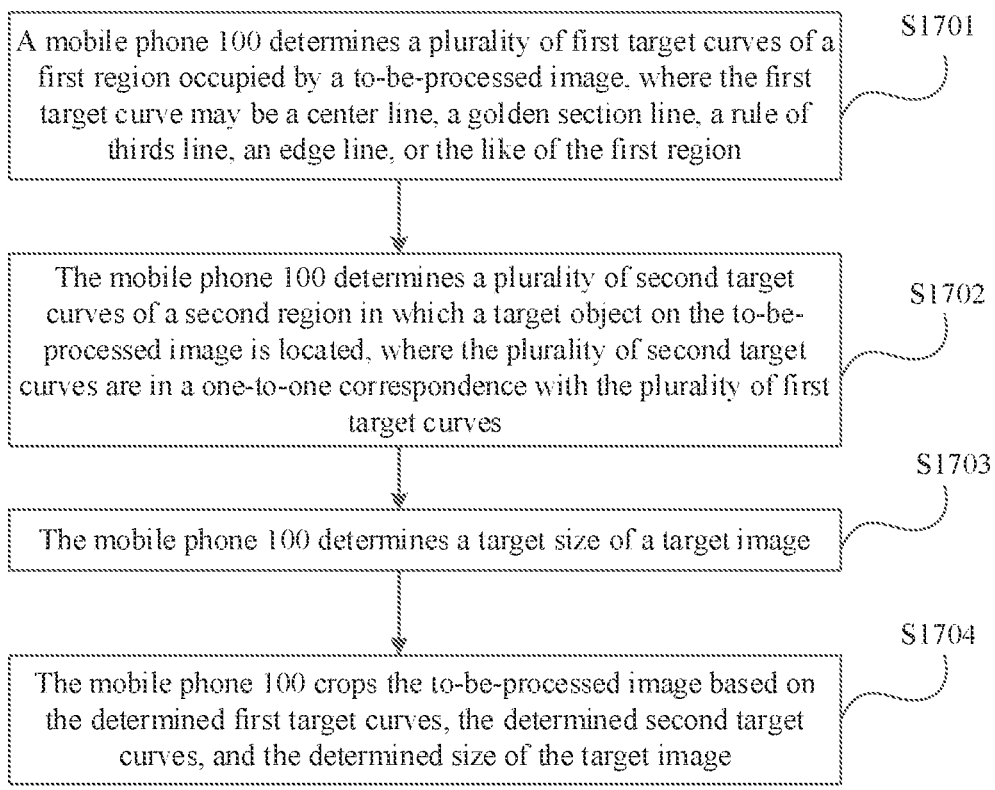
FIG. 17 is a schematic flowchart of an image cropping method according to an embodiment of this application.

In a second possible implementation. FIG. 17 is a schematic flowchart of an image cropping method according to an embodiment of this application. As shown in the figure, the process includes the following steps.

S1701. The mobile phone 100 determines a plurality of first target curves of a first region occupied by a to-be-processed image, where the first target curve may be a center line, a golden section line, a rule of thirds line, an edge line, or the like of the first region.

For example, referring to FIG. 18(a), solid lines are the plurality of first target regions of the first region in which the to-be-processed image is located.

S1702. The mobile phone 100 determines a plurality of second target curves of a second region in which a target object on the to-be-processed image is located, where the plurality of second target curves are in a one-to-one correspondence with the plurality of first target curves.

For example, still referring to FIG. 18(a), a dashed line box is the second region in which the target object is located, and dashed lines are the plurality of second target curves of the second region. The first target curves are in a one-to-one correspondence with the second target curves.

S1703. The mobile phone 100 determines a target size of a target image.

A manner of determining the target size of the target image by the mobile phone 100 has been described above, and details are not described herein again.

S1704. The mobile phone 100 crops the to-be-processed image based on the determined first target curves, the determined second target curves, and the determined size of the target image.

For example, assuming that a size of the to-be-processed image is 1200*1200 and the target size of the target image is 400*300, the mobile phone 100 may crop the to-be-processed image to obtain an image whose size is 400*300, so that after a cropped image is scaled up, a third target curve of a third region in which the target is located and the first target curve are on a same straight line. A size of the cropped image is 400*300, and a size obtained after scaling up may be 1600*1200, so that it is ensured that a width of an image obtained after scaling up is equal to a width of the original image.

For example, as shown in FIG. 18(b), after the cropped image is scaled up, a rule of thirds line of the third region in which the target object is located and the original rule of thirds line (the rule of thirds line of the first region in FIG. 18(a)) are on a same straight line, a golden section line of the third region in which the target object is located and the original golden section line are on a same straight line, and a center line of the third region in which the target object is located and the original center line are on a same straight line.

In the embodiment shown in FIG. 18(a) and FIG. 18(b), when cropping an image, the mobile phone 100 places a target object on the original image at a location of a rule of thirds line of the original image, places a center line, of a region in which the target object is located, at a location of a center line of the original image, and the like.

A third possible implementation is as follows:

In actual application, for a target object, a user may not use the foregoing several target curves, but uses a user virtual curve of the target object. The user virtual curve may be a curve pre-stored on the mobile phone 100. The user virtual curve may also include a user virtual rule of thirds line, a user virtual golden section line, a user virtual center line, and the like. The user virtual rule of thirds line is used as an example. A location of the user virtual rule of thirds line may be different from a location of an actual rule of thirds line. Therefore, the mobile phone 100 may store the user virtual rule of thirds line, and use the user virtual rule of thirds line in an image cropping process, that is, use the image cropping manner shown in the foregoing embodiments. Only the rule of thirds line of the target object in the foregoing embodiments is replaced with the user virtual rule of thirds line.

For example, the user virtual rule of thirds line is still used as an example. A manner in which the mobile phone 100 obtains the user virtual rule of thirds line may be as follows: Before delivery of the mobile phone 100, a test person photographs a to-be-photographed object (namely, the target object) by using the mobile phone 100, and may mark a curve such as a rule of thirds line, a center line, or a golden section line, namely, the user virtual curve, on the to-be-photographed object. The test person photographs the to-be-photographed object by using the mobile phone 100, and the user virtual curve marked on the to-be-photographed object is displayed on an obtained image. The user virtual rule of thirds line is used as an example. There may be an error between the user virtual rule of thirds line and a rule of thirds line of a region in which the to-be-photographed object on the image is located. However, because the user virtual rule of thirds line is specified by the user, the mobile phone 100 may store the user virtual curve, and use the stored user virtual curve in a cropping process.

It should be understood that the mobile phone 100 may pre-store user virtual curves corresponding to different target objects. When cropping an image, the mobile phone 100 may identify a target object on the image, and determine a user virtual curve corresponding to the target object.

It should be understood that in actual application, an area of the region in which the target object is located varies. For example, when the target object is a face, an area of a face box varies, and the area of the face box is related to a user virtual curve of the face box. Therefore, the mobile phone 100 may store a correspondence between the area of the face box and a user virtual curve of the face box. Before cropping an image, the mobile phone 100 may determine an area occupied by a face box on the image, determine a user virtual curve corresponding to the area based on the area and the correspondence, and crop the image in a processing manner similar to that in the foregoing embodiments. Only the rule of thirds line of the target object in the foregoing embodiments is replaced with the determined user virtual rule of thirds line.

It should be understood that the image cropping method provided in the embodiments of this application may be applied to a plurality of scenarios, for example, a scenario in which the mobile phone 100 sets an image to a desktop wallpaper or sets an image to a lock screen wallpaper, a scenario in which the mobile phone 100 sets an image to a background wall (for example, a background wall of a chat interface with a contact, a cover of Moments, a cover of a homepage of Weibo) of a social application (WeChat, Moments, Weibo, or the like) or sets an image to a cover of a song in a wie music player, or a scenario in which two communications devices communicates with each other, one device sends an image to the other device, and the other device needs to crop the image sent by the device. In conclusion, the image cropping method provided in the embodiments of this application may be applied to any scenario in which an image needs to be cropped. The scenarios are not listed one by one in this specification.

Implementations of this application may be combined randomly to implement different technical effects.

In the foregoing embodiments provided in this application, the method provided in the embodiments of this application is described from a perspective of the terminal device (the mobile phone 100) as an execution body. To implement functions in the foregoing method provided in the embodiments of this application, the terminal may include a hardware structure and/or a software module, and implement the foregoing functions in a form of the hardware structure, the software module, or the hardware structure plus the software module. Whether a function in the foregoing functions is performed in a manner of the hardware structure, the software module, or the hardware structure plus the software module depends on particular application and design constraints of the technical solution.

An embodiment of this application further provides a computer readable storage medium. The storage medium may include a memory. The memory may store a program. When the program is executed, an electronic device is enabled to perform all or some of the steps described in the method embodiments shown in FIG. 2, FIG. 12, FIG. 15, and FIG. 17.

An embodiment of this application further provides a computer program product. When the computer program product is run on an electronic device, the electronic device is enabled to perform all or some of the steps described in the method embodiments shown in FIG. 2, FIG. 12, FIG. 15, and FIG. 17.

It should be noted that, in the embodiments of this application, unit division is an example, and is merely logical function division. In actual implementation, another division manner may be used. Functional units in the embodiments of the present invention may be integrated into one processing unit, or each of the units may exist alone physically, or two or more units are integrated into one unit. For example, in the foregoing embodiments, a first obtaining unit and a second obtaining unit may be a same unit or different units. The integrated unit may be implemented in a form of hardware, or may be implemented in a form of a software functional unit.

According to the context, the term "when" used in the foregoing embodiments may be interpreted as a meaning of "if" or "after" or "in response to determining" or "in response to detecting". Similarly, according to the context, the phrase "when it is determined that" or "if (a stated condition or event) is detected" may be interpreted as a meaning of "when it is determined that" or "in response to determining" or "when (a stated condition or event) is detected" or "in response to detecting (a stated condition or event)".

All or a part of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For a purpose of explanation, the foregoing description is described with reference to specific embodiments. However, the foregoing example discussion is not intended to be detailed, and is not intended to limit this application to a disclosed precise form. According to the foregoing teaching content, many modification forms and variation forms are possible. Embodiments are selected and described to fully illustrate the principles of this application and practical application of the principles, so that other persons skilled in the art can make full use of this application and various embodiments that have various modifications applicable to conceived specific usage.

What is claimed is:

1. A method implemented by an electronic device, wherein the method comprises:
    obtaining a first image;
    determining a first target curve of a first region occupied by the first image, wherein a first area of the first region is equal to a second area of the first image;
    determining a target object in the first image;
    moving the first image to obtain a second image, wherein the target object is in the second image, wherein a second target curve of a second region that comprises the target object is proximate to or overlaps the first target curve, and wherein the second region is an external polygon of the target object;
    cropping out an image part of the second image that is moved out of the first region;
    determining a first ratio of a first width of a remaining image on the second image to a second width of a third region that comprises the target object in the remaining image; and
    cropping the remaining image to obtain a third image when the first ratio is greater than a first threshold,
    wherein a second ratio of a first distance between a first upper edge of the third region and a second upper edge of the third image to a second distance between a first lower edge of the third region and a second lower edge of the third image is equal to a third ratio of a third distance between the first upper edge and a third upper edge of the remaining image to a fourth distance between the first lower edge and a third lower edge of the remaining image.

2. The method of claim 1, wherein the target object is at least one of:
    a preset object;
    a first object specified by a user on the first image; or
    a second object of a plurality of third objects in the first image.

3. The method of claim 1, wherein before moving the first image, the method further comprises determining that a distance between a third target curve of a third region that comprises the target object and the first target curve is greater than a preset distance.

4. The method of claim 1, wherein the first image comprises N people, wherein the target object comprises N faces, and wherein the second region is a minimum external rectangle of N face boxes that comprise the N faces.

5. The method of claim 1, wherein before determining the first target curve, the method further comprises:
    determining M first target curves of the first region, wherein M is an integer greater than or equal to 2;
    determining M third target curves of a third region that comprises the target object, wherein the M first target curves are in a one-to-one correspondence with the M third target curves;
    determining a distance value between an $i^{th}$ first target curve and an $i^{th}$ third target curve to obtain M distance values, wherein i is an integer ranging from 1 to M; and
    determining a target curve corresponding to a maximum distance value in the M distance values as the first target curve.

6. The method of claim 1, wherein after cropping the image part, the method further comprises:
    determining a ratio of a first width of a remaining image on the second image to a second width of a third region that comprises the target object in the remaining image;
    cropping the remaining image to obtain a third image when the ratio is greater than a first threshold and when a first distance between a first upper edge of the third region and a second upper edge of the remaining image is greater than a first preset distance, wherein a second distance between the first upper edge and a third upper edge of the third image is within a first distance range; and
    cropping the remaining image to obtain a fourth image when the ratio is less than or equal to the first threshold and when a third distance between a first lower edge of the third region and a second lower edge of the remaining image is greater than a second preset distance, wherein a fourth distance between the first lower edge and a third lower edge of the fourth image is within a second distance range.

7. A method implemented by an electronic device, wherein the method comprises:
    obtaining a first image;
    determining at least two target curves of a first region that comprises the first image, wherein a first area of the first region is equal to a second area of the first image;
    determining a first center line of a second region that comprises a target object on the first image, wherein the second region is an external polygon of the target object;
    determining a first target curve that is in the at least two target curves and that is proximate to the first center line;
    determining a target size of a second image that is to be obtained after cropping the first image;
    cropping the first image based on the target size and the first target curve to obtain the second image,
    wherein a second target curve of a third region that comprises the second image and is proximate to or overlaps the first target curve, wherein
    the second target curve corresponds to the first target curve, and wherein a third area of the third region is equal to a fourth area of the second image;
    determining a first ratio of a first width of a remaining image on the second image to a second width of a third region that comprises the target object in the remaining image; and
    cropping the remaining image to obtain a third image when the first ratio is greater than a first threshold, wherein a second ratio of a first distance between a first upper edge of the third region and a second upper edge of the third image to a second distance between a first lower edge of the third region and a second lower edge of the third image is equal to a third ratio of a third distance between the first upper edge and a third upper edge of the remaining image to a fourth distance between the first lower edge and a third lower edge of the remaining image.

8. The method of claim 7, wherein the target object is at least one of:
a preset object;
a first object specified by a user on the first image; or
a second object of a plurality of third objects in the first image.

9. The method of claim 7, wherein the first image comprises N people, wherein the target object comprises N faces, and wherein each of the second region and the third region is a minimum external rectangle of N face boxes that comprise the N faces.

10. The method of claim 7, further comprising:
determining a ratio of a first width of the second image to a second width of a fourth region that comprises the target object;
cropping the second image to obtain a third image when the ratio is greater than a first threshold and when a first distance between a first upper edge of the fourth region and a second upper edge of the second image is greater than a first preset distance wherein a second distance between the first upper edge and a third upper edge of the third image is within a first distance range; and
cropping the second image to obtain a fourth image when the ratio is less than or equal to the first threshold and when a third distance between a first lower edge of the fourth region and a second lower edge of the second image is greater than a second preset distance wherein a fourth distance between the first lower edge and a third lower edge of the fourth image is within a second distance range.

11. The method of claim 7, further comprising:
determining a first ratio of a first width of the second image to a second width of a fourth region that comprises the target object; and
cropping the second image to obtain a third image when the first ratio is greater than a first threshold,
wherein a second ratio of a first distance between a first upper edge of the fourth region and a second upper edge of the third image to a second distance between a first lower edge of the fourth region and a second lower edge of the third image is equal to a third ratio of a third distance between the first upper edge and a third upper edge of the second image to a fourth distance between the first lower edge and a third lower edge of the second image.

12. An electronic device comprising:
a memory configured to store a first image and one or more computer programs; and
a processor coupled to the memory, wherein when executed by the processor, the one or more computer programs cause the electronic device to:
obtain a first image;
determine a first target curve of a first region occupied by the first image, wherein a first area of the first region is equal to a second area of the first image;
determine a target object in the first image;
move the first image to obtain a second image, wherein a second target curve of a second region that comprises the target object is proximate to or overlaps the first target curve, and wherein the second region is an external polygon of the target object;
crop out an image part of the second image that is moved out of the first region; wherein the second target curve is:
determine a first ratio of a first width of a remaining image on the second image to a second width of a third region that comprises the target object in the remaining image; and
crop the remaining image to obtain a third image when the first ratio is greater than a first threshold,
wherein a second ratio of a first distance between a first upper edge of the third region and a second upper edge of the third image to a second distance between a first lower edge of the third region and a second lower edge of the third image is equal to a third ratio of a third distance between the first upper edge and a third upper edge of the remaining image to a fourth distance between the first lower edge and a third lower edge of the remaining image.

13. The electronic device of claim 12, wherein the target object is at least one of:
a preset object;
a first object specified by a user on the first image; or
a second object of a plurality of third objects in the first image.

14. The electronic device of claim 12, wherein before moving the first image, when executed by the processor, the one or more computer programs further cause the electronic device to determine that a distance between a third target curve of a third region that comprises the target object and the first target curve is greater than a preset distance.

15. The electronic device of claim 12, wherein the first image comprises N people, wherein the target object comprises N faces, and wherein the second region is a minimum external rectangle of N face boxes that comprise the N faces.

16. The electronic device of claim 12, wherein before determining the first target curve, when executed by the processor, the one or more computer programs further cause the electronic device to:
determine M first target curves of the first region, wherein M is an integer greater than or equal to 2;
determine M third target curves of a third region that comprises the target object, wherein the M first target curves are in a one-to-one correspondence with the M third target curves;
determine a distance value between an $i^{th}$ first target curve and an $i^{th}$ third target curve to obtain M distance values, wherein i is an integer ranging from 1 to M; and
determine a target curve corresponding to a maximum distance value in the M distance values as the first target curve.

17. The method of claim 1, wherein the second center line is a straight line that passes through a center of the second region, the second golden section line is a straight line that divides the second region into two regions, and the second rule of thirds line is a straight line that divides the second image into two regions, where a ratio between the two regions is one third.

18. The method of claim 7, wherein the second center line is a straight line that passes through a center of the second region, the second golden section line is a straight line that divides the second region into two regions, and the second rule of thirds line is a straight line that divides the second image into two regions, where a ratio between the two regions is one third.

19. The electronic device of claim 12, wherein the second center line is a straight line that passes through a center of the second region, the second golden section line is a straight line that divides the second region into two regions, and the second rule of thirds line is a straight line that divides the second image into two regions, where a ratio between the two regions is one third.

20. The electronic device of claim 12, wherein after cropping the image part, the method further comprises:
- determine a ratio of a first width of a remaining image on the second image to a second width of a third region that comprises the target object in the remaining image;
- crop the remaining image to obtain a third image when the ratio is greater than a first threshold and when a first distance between a first upper edge of the third region and a second upper edge of the remaining image is greater than a first preset distance, wherein a second distance between the first upper edge and a third upper edge of the third image is within a first distance range; and
- crop the remaining image to obtain a fourth image when the ratio is less than or equal to the first threshold and when a third distance between a first lower edge of the third region and a second lower edge of the remaining image is greater than a second preset distance, wherein a fourth distance between the first lower edge and a third lower edge of the fourth image is within a second distance range.

* * * * *

UNITED STATES PATENT AND TRADEMARK OFFICE
CERTIFICATE OF CORRECTION

PATENT NO. : 12,217,336 B2  
APPLICATION NO. : 17/435493  
DATED : February 4, 2025  
INVENTOR(S) : Yundie Zhang, Liang Hu and Yifan Ji It is certified that error appears in the above-identified patent and that said Letters Patent is hereby corrected as shown below:

On the Title Page

Page 2 - Item (56) OTHER PUBLICATIONS: "Kiaoxin, T., "Chinese version of Photoshop CS6 graphic image processing basis and example," Ocean Press, Jan. 2014, 12 pages with English abstract."
Should read:
"Xiaoxin, T., "Chinese version of Photoshop CS6 graphic image processing basis and example," Ocean Press, Jan. 2014, 12 pages with English abstract."

In the Claims

Claim 12, Column 32, Lines 5-6: "moved out of the first region; wherein the second target curve is:"
Should read:
"moved out of the first region;"

Signed and Sealed this  
First Day of April, 2025

Coke Morgan Stewart  
*Acting Director of the United States Patent and Trademark Office*